US010311016B2

(12) United States Patent
Heggelund et al.

(10) Patent No.: US 10,311,016 B2
(45) Date of Patent: Jun. 4, 2019

(54) HIDDEN SURFACE REMOVAL IN GRAPHICS PROCESSING SYSTEMS

(71) Applicant: ARM Limited, Cambridge (GB)

(72) Inventors: Frode Heggelund, Trondheim (NO); Toni Viki Brkic, Staffanstorp (SE); Reimar Gisbert Döffinger, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/607,919

(22) Filed: May 30, 2017

(65) Prior Publication Data

US 2018/0349315 A1 Dec. 6, 2018

(51) Int. Cl.
*G06F 15/78* (2006.01)
*G06T 15/40* (2011.01)
*G06T 1/20* (2006.01)

(52) U.S. Cl.
CPC ........ *G06F 15/7882* (2013.01); *G06T 15/405* (2013.01); *G06T 1/20* (2013.01)

(58) Field of Classification Search
USPC ....................................................... 345/614
See application file for complete search history.

(56) References Cited

U.S. PATENT DOCUMENTS

| 9,153,070 | B2 | 10/2015 | Nystad |
| 9,454,844 | B2 | 9/2016 | Doffinger |
| 2003/0080957 | A1* | 5/2003 | Stewart ............... G06F 17/5018 345/420 |
| 2003/0151606 | A1* | 8/2003 | Morein ................. G06T 15/405 345/422 |
| 2014/0168220 | A1* | 6/2014 | Nystad .................... G06T 15/40 345/421 |
| 2014/0354654 | A1* | 12/2014 | Heggelund ............... G06T 1/20 345/501 |
| 2014/0375637 | A1* | 12/2014 | Heggelund ............. G06T 15/40 345/421 |
| 2015/0097831 | A1* | 4/2015 | Doffinger ............. G06T 15/405 345/422 |
| 2015/0130798 | A1* | 5/2015 | Heggelund ........... G06T 15/005 345/420 |
| 2017/0272722 | A1* | 9/2017 | Salvi .................. H04N 13/0018 |
| 2018/0108167 | A1* | 4/2018 | Nystad ................. G06T 15/005 |

* cited by examiner

*Primary Examiner* — Wesner Sajous
(74) *Attorney, Agent, or Firm* — Vierra Magen Marcus LLP

(57) ABSTRACT

A graphics processing pipeline includes a rasteriser, an early culling tester, a renderer, a late culling tester, and a culling test data buffer that stores data values for use by the early and late culling testers. The testing of fragments by the early and late culling testers is controlled in accordance with a first set of state information indicative of when a culling test operation to be used to determine whether to cull the fragments is to be performed, and a second set of state information indicative of when to determine whether to update the culling test data buffer with data for the fragments based on a culling test operation, allocated to the fragments.

21 Claims, 5 Drawing Sheets

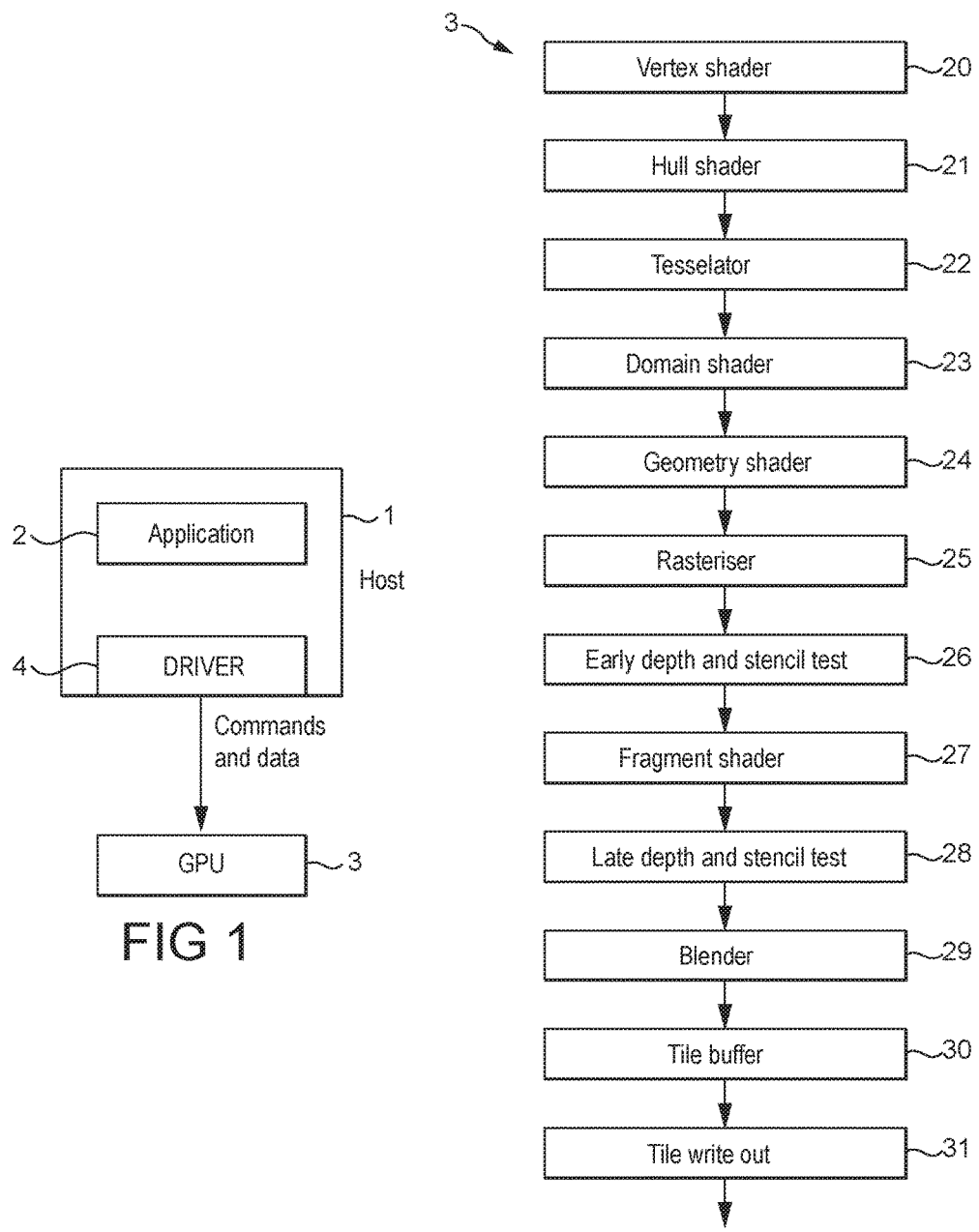

HIDDEN SURFACE REMOVAL IN GRAPHICS PROCESSING SYSTEMS

BACKGROUND

The technology described herein relates to the processing of computer graphics, and in particular to hidden surface removal in graphics processing.

Graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

Once the primitives have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve performing fragment shading, applying textures, blending sample point data values, etc.

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(Correspondingly, each graphics fragment may typically be the same size and location as a "pixel" of the output (e.g. output frame), but it can be the case that there is not a one-to-one correspondence between a fragment and a display pixel, for example where particular forms of post-processing, such as downsampling, are carried out on the rendered image prior to displaying the final image.)

One drawback of current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater).

The problem of "overdraw" could be significantly reduced by sending primitives for rendering in front-to-back order. However, other graphics processing requirements, such as the need for coherent access to resources such as textures, and the need to minimise the number of API calls per frame, generally mandate other preferred ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of other techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

One such technique is to carry out forms of hidden surface removal before a primitive and/or fragment is sent for rendering, to see if the primitive or fragment etc. will be obscured by a primitive that has already been rendered (in which case the new fragment and/or primitive need not be rendered). Such so-called "early" hidden surface removal may comprise, for example, early occlusion culling, such as early-Z (depth) and/or stencil, testing processes (and is in addition to the "late" hidden surface removal, such as late depth testing that will take place after the rendering process).

These arrangements try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) hidden surface removal techniques can still suffer from inefficiencies.

For example, a later graphics fragment for a given sampling position in the render output being generated may only be able to be tested (e.g. depth tested) when an earlier graphics fragment (that is already being processed) for that position in the render output has completed its processing (so as to allow all the required information for testing the later graphics fragment to be available in the, e.g., depth buffer). When such a "dependency" occurs, the later graphics fragment could either be stalled at the early hidden surface removal test stage until the earlier graphics fragment or fragments (that preceded it into the graphics processing pipeline) have completed their processing, or the early hidden surface removal (e.g. depth) test could be skipped for the later graphics fragment, and that fragment simply issued to the rendering pipeline regardless (and then tested at the late hidden surface removal stage when it reaches the end of the rendering pipeline).

However, both of these arrangements can lead to inefficiencies. For example, in the former case, there may be a delay in processing and throughput of the graphics fragments. In the latter case, graphics fragments that would in fact have been occluded will be issued to the rendering pipeline and processed.

The Applicants believe therefore that there remains scope for improved techniques for hidden surface removal in graphics processing systems.

BRIEF DESCRIPTION OF THE DRAWINGS

A number of embodiments of the technology described herein will now be described by way of example only and with reference to the accompanying drawings, in which:

FIG. 1 shows an exemplary graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
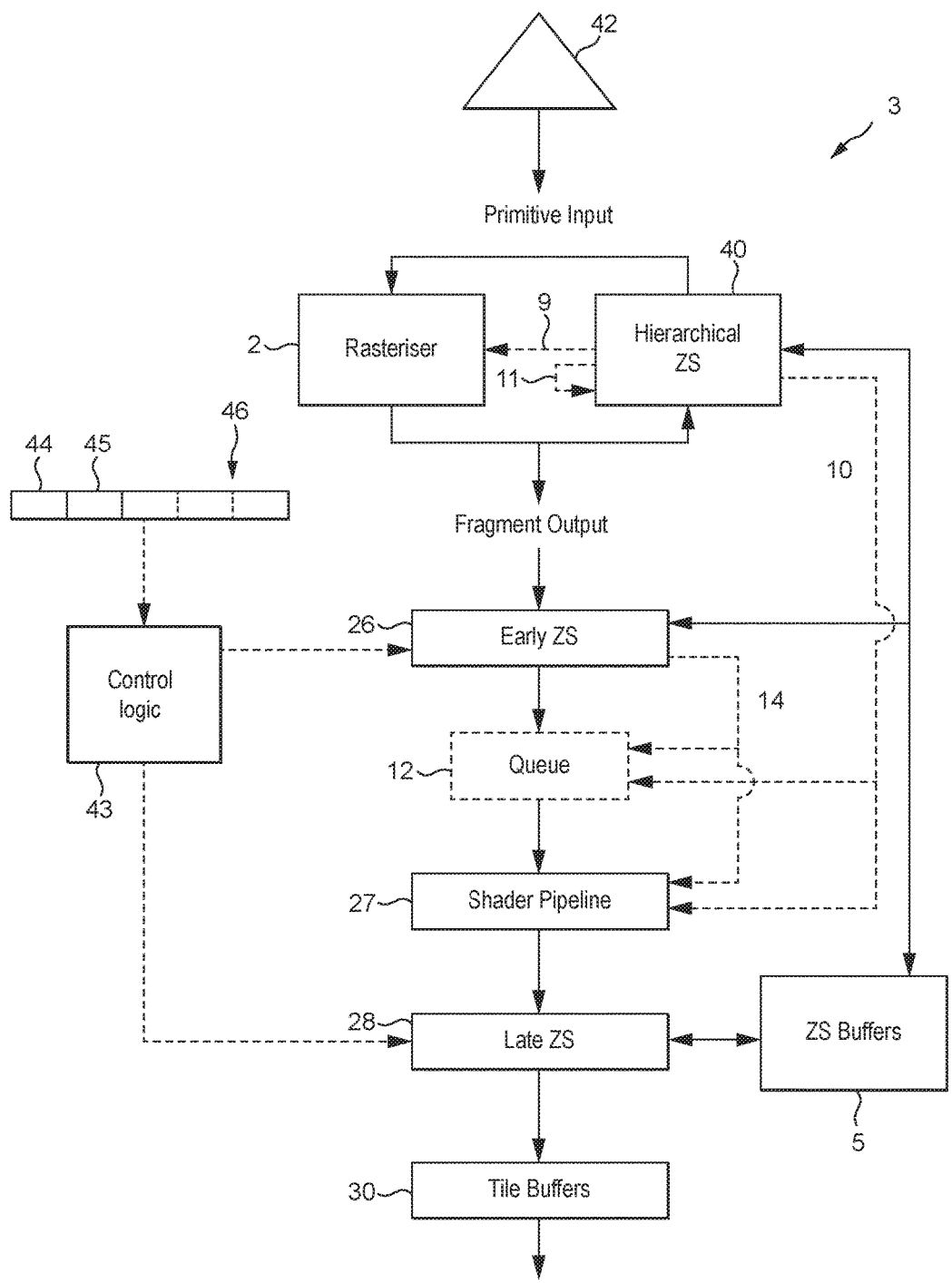
FIG. 3 shows the depth and stencil testing arrangement of the graphics processing pipeline shown in FIG. 2 in more detail.

A first embodiment of the technology described herein comprises a method of operating a graphics processing pipeline that includes:
  a rasteriser that rasterises input primitives to generate graphics fragments to be processed, each graphics fragment having one or more sampling points associated with it;
  a renderer that processes fragments generated by the rasteriser to generate output fragment data;
  an early culling tester operable to perform an early culling test on fragments generated by the rasteriser before the fragments are sent to renderer for processing;
  a late culling tester operable to perform a late culling test on fragments that have been processed by the renderer before the fragments are output by the renderer to provide output fragment data for sampling points associated with the fragments; and
  a culling test data buffer operable to store data values for use by the early and late culling testers;
  the method comprising:
  providing for a graphics fragment generated by the rasteriser:
    a first set of state information indicative of when a culling test operation to be used to determine whether to cull the fragment is to be performed; and
    a second set of state information indicative of when to determine whether to update the culling test data buffer with data for the fragment based on a culling test operation;
  and
  the graphics processing pipeline:
    subjecting the fragment to a culling test operation in accordance with the first set of state information provided for the fragment to determine whether to cull the fragment or not; and
    determining whether to update the culling test data buffer with data for the fragment based on a culling test operation in accordance with the second set of state information provided for the fragment.

A second embodiment of the technology described herein comprises a graphics processing system, comprising:
  a graphics processing pipeline comprising:
    a rasteriser that rasterises input primitives to generate graphics fragments to be processed, each graphics fragment having one or more sampling points associated with it;
    a renderer that processes fragments generated by the rasteriser to generate output fragment data;
    an early culling tester operable to perform an early culling test on fragments generated by the rasteriser before the fragments are sent to renderer for processing;
    a late culling tester operable to perform a late culling test on fragments that have been processed by the renderer before the fragments are output by the renderer to provide output fragment data for sampling points associated with the fragments; and
    a culling test data buffer operable to store data values for use by the early and late culling testers;
  the graphics processing system further comprising:
  processing circuitry operable to provide for a graphics fragment generated by the rasteriser:
    a first set of state information indicative of when a culling test operation to be used to determine whether to cull the fragment is to be performed; and
    a second set of state information indicative of when to determine whether to update the culling test data buffer with data for the fragment based on a culling test operation;
  and
  the graphics processing pipeline further being operable to:
    subject a fragment to a culling test operation in accordance with a first set of state information provided for the fragment to determine whether to cull the fragment or not; and
    determine whether to update the culling test data buffer with data for a fragment based on a culling test operation in accordance with a second set of state information provided for the fragment.

The graphics processing pipeline of the technology described herein includes both an early culling test, such as an early depth test, before the renderer stage in the graphics processing pipeline, and a late culling test, such as a late depth test, after the renderer stage of the graphics processing pipeline. Both of these culling tests use a buffer that stores appropriate culling test data (e.g. a depth buffer) for use by the culling tests.

In the technology described herein, state information is provided for graphics fragments that can be used to indicate when the culling tests should be performed for the purpose of culling ("killing") a fragment being processed, and, separately, when the culling tests should be used for the purpose of updating the culling test data buffer for a graphics fragment being processed.

As will be discussed further below, this can facilitate more efficient hidden surface removal in the graphics processing pipeline, and in particular allow more early culling testing (potentially) to be performed, thereby providing more efficient hidden surface removal, even in the case where there may be, for example, "dependencies" between fragments covering the same locations in the render output being generated. Additionally or alternatively, the arrangement of the technology described herein can also be used to reduce or break the number of dependencies in a sequence of fragments being processed, thereby again potentially allowing more fragments to undergo early culling than would otherwise be the case.

Furthermore, providing state information for controlling the updating of the culling test data buffer (e.g. depth buffer) that is separate to the state information that controls the "culling" of the fragments using the culling tests increases the flexibility of the operation, and, for example, can facilitate different treatment of fragments with respect to updating of the culling test data buffer as opposed to their actual culling by the culling tests. This can accordingly again allow, as will be discussed further below, more efficient hidden surface removal when generating a render output.

The technology described herein can accordingly be used to more efficiently reduce the extent to which hidden surfaces are unnecessarily processed in a graphics processing pipeline, as compared, e.g., to existing early depth testing techniques.

The rasteriser of the graphics processing pipeline can be configured to operate in any suitable and desired manner, for example as in known rasterising arrangements. It should, and in an embodiment does, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, a (and each) primitive being rasterised.

Each fragment generated by the rasteriser may represent (have associated with it) a single sampling point, or plural sampling points, as desired. In an embodiment, each fragment represents a set of plural, in an embodiment four (2×2), sampling points.

In an embodiment, the rasteriser is a hierarchical rasteriser that operates to iteratively test primitives against progressively smaller patches of sampling points down to a given, in an embodiment selected, in an embodiment predetermined, minimum patch size, discarding any patches that do not cover the primitive (at least in part), and to then generate a fragment or fragments for rendering corresponding to the patch or patches of sampling points found to be covered at least in part by the primitive. Each patch of sampling points that is tested in an embodiment corresponds to an integer number of fragments, such as 16×16, 8×8, 4×4 and/or 2×2 fragments.

The renderer of the graphics processing pipeline should be and is in an embodiment, operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc.

In an embodiment the renderer comprises a fragment shader (a shader pipeline) (i.e. a programmable pipeline stage that is operable to and can be programmed to carry out fragment shading programs on fragments in order to render them). The technology described herein may be particularly advantageous where fragment shading is being used, as fragment shading can be a relatively costly process, and so more efficient early removal of hidden surfaces is particularly advantageous where fragment shading is being done.

The output rendered fragment data generated by the renderer is in an embodiment written to an output buffer, such as a frame buffer, in external memory, for use (e.g. to display a frame on a display). This may be via one or more intermediate buffers, such as one or more tile buffers in the case of a tile-based graphics processing pipeline, and/or via one or more processing, e.g., down-sampling, stages, if desired.

The culling test data buffer should be, and is in an embodiment, a buffer that stores data values for use by the early and late culling testers. It may comprise separate buffers for storing data values for use by the early culling tester and the late culling tester, respectively, and/or there could be a (single) buffer that is used in common by both the early and late culling testers.

The culling test data buffer or buffers should store appropriate data values for use by the early and late culling testers. Thus the data values that are stored should, and in an embodiment do, depend upon the nature of the early and late culling tests that the early and late culling testers perform. In an embodiment, the culling test data buffer stores depth values. In may also or instead store stencil values.

The culling test data buffer may store the data values (e.g. depth values) for use by the early and late culling testers at any desired resolution. For example, and in an embodiment, data (e.g. depth) values may be stored for individual sampling positions in the render output being generated, for sets of plural sampling positions (e.g. corresponding to individual fragments) in the render output being generated, and/or for larger patches of the render output (e.g. comprising plural fragments) (for example in the case where the rasteriser is a hierarchical rasteriser as discussed above).

The data values that are stored in the culling test data buffer may comprise, e.g., individual (absolute) values, and/or suitable ranges of values (e.g. depth value ranges) may be stored for respective render output regions (locations), as desired.

As discussed above, and as will be discussed in more detail below, the updating of the data values in the culling test data buffer is controlled in the technology described herein by the second set of state information provided for the fragments (is performed in accordance with the culling test data buffer update state information for the fragments).

All the culling test data (e.g. depth) buffers used by the graphics processing pipeline should be, and are in an embodiment, updated appropriately when at least one sampling point associated with a fragment passes the indicated culling (e.g. depth) test. Thus, for example, where both the early and the late depth testing stages of the pipeline share a common depth buffer, that buffer should be updated, and where there are separate early and late depth buffers, then in an embodiment both (or all) of those buffers are updated.

The early culling test of the technology described herein (that is controlled in the manner of the technology described herein) may comprise any suitable such test. It in an embodiment comprises an early occlusion test, such as a depth (Z) test and/or stencil test. In an embodiment it comprises an early depth (Z) test (or tests). In an embodiment it comprises both early depth and early stencil tests.

The early culling test that is operated in the manner of the technology described herein should, and in an embodiment does, operate on single fragments. It is in an embodiment performed per sample, and so in an embodiment operates on (tests) (covered) sampling points of the set of sampling points that a given fragment is associated with individually. Thus, the early culling test in an embodiment operates on single (covered) sampling points. (The test will test (individually) those sampling points that a fragment is being used to render (i.e. that are covered by the primitive in question).) In this case each sampling point in an embodiment has an associated, e.g. depth, value, i.e., there will be a, e.g. depth, value for each sampling point (which it may share with other sampling points), that is used for the culling test.

The test may also be performed once for a (and per) fragment when using a sampling mode that tests a single sample per fragment.

In an embodiment, there is also an early culling test stage (tester) that operates on patches (sets) of plural fragments. For example, where the rasteriser is a hierarchical rasteriser that can rasterise primitives into patches of plural fragments (as discussed above), such patches could then be subject as a whole to an early culling (e.g. depth) test. This test is in an embodiment carried out only for patches (sets) of plural fragments that are fully (completely) covered by the primitive in question, and in an embodiment uses a range of, e.g. depth, values for the patch (set) of plural fragments.

Thus, in an embodiment, the pipeline includes an early culling test that tests sets (patches) of plural fragments, followed by an early culling test that tests individual fragments (whether as a whole, or in terms of their respective (individual) sampling points) (and which early culling test is controlled in the manner of the technology described herein).

The early culling test or tests may be implemented, e.g., as part of the rasteriser, or after the rasteriser (but before the renderer), or as a combination of this (e.g. where there is more than one early culling test). In an embodiment it or they are implemented as part of the rasterisation process and/or after the rasteriser but before the rest of the graphics processing pipeline.

The late culling test of the technology described herein (that is controlled in the manner of the technology described herein) may comprise any suitable such test, but in an embodiment comprises an occlusion test, such as a depth (Z) test and/or a stencil test. In an embodiment it comprises a (late) depth (Z) test (or tests). In an embodiment it comprises both late depth and late stencil tests.

The late culling test that is operated in the manner of the technology described herein should, and in an embodiment does, operate per sample (and thus tests (covered) sampling positions (points) individually). Thus, it in an embodiment operates on (tests), single (covered) sampling points that a given fragment is associated with. In this case each sampling point in an embodiment has an associated, e.g. depth, value, i.e., there will be a, e.g. depth, value for each sampling point (which it may share with other sampling points), that is used for the late culling test.

The early and late culling tests themselves can be carried out in any suitable and desired manner, e.g., in the normal manner used in the graphics processing system in question.

The result of a culling test performed in respect of a fragment will be used as appropriate either to determine whether the fragment is to be culled, or whether the fragment is to be used to update the culling test data buffer.

In the case where the fragment is being tested to determine whether to cull the fragment or not, then if the fragment being tested fails the culling test (e.g. is found to be occluded), then that fragment (or at least its appropriate sampling point or points) should be and are in an embodiment "culled" from further processing in the pipeline (i.e. have their further processing in the pipeline suppressed). In the case of the early culling test, such culling of a fragment from further processing in the pipeline in an embodiment comprises not subjecting the fragment to the rendering operations (shader pipeline), in an embodiment by not sending the fragment onwards through the pipeline for processing.

In this case, if (when) the cull test finds that fewer than all of the (covered) sampling points associated with a fragment to be rendered should be culled, then in an embodiment further processing of the sampling points in question (i.e., that failed the cull test) that can be avoided on an individual sampling point basis, such as blending, is prevented (stopped), e.g., by marking the sampling points as "disabled" (e.g. by indicating them to not be covered in a coverage mask associated with the fragment in question), or in any other suitable manner, but the fragment in question is still sent onwards (through the pipeline) so that the "non-culled" sampling points associated with the fragment will still be processed.

On the other hand, if (when) at least one sampling point for a fragment being tested passes the early culling test, then the sampling point (i.e. the fragment that the sampling point is associated with) that was tested is sent onwards for processing (e.g. towards the renderer).

If the culling test is a late culling test, then the fragment is in an embodiment "culled" from further processing by not using the rendered fragment data for the fragment (or at least for its appropriate sampling points) as rendered output data for the render output being generated. Thus the rendered fragment data for (any culled sampling points for) the fragment will, e.g., and in an embodiment, not be written to the tile and/or frame buffer, for example.

Thus, in an embodiment, the method of the technology described herein comprises (and the graphics processing pipeline is operable to (includes processing circuitry operable to)) using the result of the culling test operation performed in accordance with the first set of state information provided for the fragment to determine whether to cull the fragment or not; and when it is determined to on the basis of that operation to cull the fragment, culling the fragment; and when it is determined to not cull the fragment, not culling the fragment.

On the other hand, if (when) the culling test is being used to determine whether to update the culling test data buffer with respect to the fragment being tested, if (when) a sampling point or points of the fragment being tested passes the culling test, then the culling test data buffer should be appropriately updated with new data for the sampling point (s) in question (that passed the culling test). Correspondingly, if (when) a sampling point or points of the fragment being tested fails the culling test, then the culling test data buffer should not be, and is in an embodiment not, updated with data for the sampling points of the fragment in question (that failed the test).

Thus, in an embodiment, the method of the technology described herein comprises (and the graphics processing pipeline is operable to (and includes processing circuitry operable to)) using the result of the culling test operation performed in accordance with the second set of state information provided for the fragment to determine whether to update the culling test data buffer with data for the fragment or not; and when it is determined on the basis of that operation to update the culling test data buffer, updating the culling test data buffer with data for the fragment; and when it is determined to not update the culling test data buffer, not updating the culling test data buffer with data for the fragment.

The first and second sets of state information for indicating when a fragment should be tested for culling, and used for culling test data buffer update purposes, can be provided in any suitable and desired manner. For example, that state information could be provided on a per fragment or a per primitive basis (with the fragments of a primitive then using the state information for the primitive).

In an embodiment, the state information is provided for sets of one or more primitives (and in an embodiment for plural primitives) in common, and in an embodiment for respective draw calls. Thus, in an embodiment, first and second sets of state information are provided for a (e.g., in an embodiment for plural, and in an embodiment for each) draw call, and then every primitive to be processed for that draw call (and accordingly every fragment that any primitive of the draw call is rasterised to) will use and be processed in accordance with the state information set for the draw call.

Thus, in an embodiment, the state information is provided for a fragment (and for plural fragments) by providing first and second sets of state information for a graphics draw call that is to be used in common for all primitives and fragments of the draw call.

Other levels of granularity for providing and setting the state information, such as for a complete render output, could also or instead be used, if desired.

The state information may be provided in any appropriate and desired form. It is in an embodiment provided as appropriate data fields (e.g. flags) in an appropriate state descriptor for the graphics processing output being generated (and thus, e.g., and in an embodiment, is provided as appropriate fields (flags) in a relevant draw call descriptor, where the state information is defined and provided for respective draw calls).

As will be discussed further below, the state information can in an embodiment indicate which of plural modes of operation is to be used, and so may, for example, comprise a field of a few bits to allow different modes of operation to be indicated. In an embodiment each set of state information comprises a 2-bit flag (which can accordingly therefore indicate which of four different modes of operation is to be used for a fragment).

Other arrangements would, of course, be possible.

The respective sets of state information are in an embodiment each able to indicate which one of a plurality of different, in an embodiment selected, in an embodiment predefined, operating modes for the culling of fragments, and updating of the culling test data buffer using fragments, respectively, is to be performed for the fragment in question (that the state information relates to). In an embodiment, each set of state information can indicate which one of four different modes of operation is to be used for a fragment, although other arrangements would, of course, be possible.

The first and second sets of state information indicate when a culling test operation is to be used to determine whether to cull a fragment and when it should be determined whether to update the culling test data buffer with data for a fragment, respectively. Thus the sets of state information indicate at what point (location) in the sequence of stages (steps) of the graphics processing pipeline, the relevant operation is to be performed.

The first set of state information in an embodiment indicates whether an early culling test (the early culling tester) or a late culling test (the late culling tester) (or, potentially, both) are to be used to determine whether to cull a fragment or not. The second set of state information correspondingly in an embodiment indicates whether it should be determined whether to update the culling test data buffer with data for a fragment at the early culling test stage (at the early culling tester) or at the late culling test stage (at the late culling tester).

A set of state information is accordingly in an embodiment able to indicate whether a fragment should be subjected to an early culling test or not (whether for the purposes of potentially culling the fragment or for deciding whether to update the culling test data buffer if the fragment passes the test).

Correspondingly, a set of state information is in an embodiment able to indicate whether a fragment should be subjected to a late culling test or not (whether for the purposes of potentially culling the fragment or for deciding whether to update the culling test data buffer if the fragment passes the test).

Thus, in an embodiment, each set of state information that indicates how a fragment should be tested, can in an embodiment indicate whether the fragment is to undergo an early culling test or a late culling test for the purpose in question.

In an embodiment, a set of state information can also indicate whether the fragment should undergo one or other of those tests only when (if) a particular, in an embodiment selected, in an embodiment predetermined, condition or conditions is met.

In an embodiment a set of state information can indicate that a fragment should undergo both the early and late culling tests. In this case, such operation is in an embodiment dependent upon at least one, in an embodiment selected, in an embodiment predefined, condition being met.

Where the performing of an early and/or late culling test is dependent upon a condition or conditions being met, then those conditions can be any suitable and desired conditions, and can be selected as desired.

In an embodiment, a condition comprises whether the fragment being tested has a dependency upon (upon the processing of) another fragment that is already present in the graphics processing pipeline (i.e. that there is another (at least one other) earlier fragment that is in the graphics processing pipeline that is for (that covers) the same location (sampling position(s)) in the render output being generated but which has not yet completed its processing to determine whether it will update the culling test data buffer or not (and to update the buffer, if appropriate), and for which earlier fragment the relevant culling test data (e.g. depth and/or stencil value) is needed for testing the fragment currently being considered).

In an embodiment, the condition(s) also or instead comprises whether the fragment has been subjected to and failed the early culling test (in this case, the condition would be, e.g., that the fragment is to be subjected to the late culling test unless the early culling test is run and the fragment fails that early culling test).

In an embodiment, a set of state information can indicate that a fragment should wait (or not) for any dependency that it has on (the processing of) any earlier fragments in the pipeline to clear (to be resolved) (i.e. for the earlier fragment (s) to complete their updating of the culling test data buffer (or be culled before (without) updating that buffer), before it is subjected to a culling test (to the indicated culling test).

In an embodiment, the first set of state information that indicates the culling test operation that is to be performed to determine whether to cull a fragment can indicate a "force-early" mode of operation, in which the fragment will undergo the early culling test (and be culled if it fails that early culling test). In an embodiment this mode of operation also requires (and causes) a fragment to be stalled until any dependency that it has on another earlier fragment in the pipeline has cleared before it undergoes the early culling test (this will then ensure that the early culling test can be correctly and reliably be carried out).

The first set of state information can in an embodiment also or instead, and in an embodiment also, indicate a "strong-early" mode of culling operation, in which a fragment will be subjected to the early culling test without waiting for any dependency on another fragment to be resolved. In this case, if (when) the fragment does not have any dependency on any other fragment, then the early culling test can be, and is in an embodiment, performed in the normal manner.

On the other hand, if the fragment has a dependency on another fragment, then the early culling test is still performed without waiting for that dependency to be resolved (e.g. for the other fragment to complete its processing and to update the culling test data buffer), but in an appropriately conservative manner and to the extent possible, so as to only identify the fragment as being able to be culled if it can be determined by the early culling test with the necessary certainty that the fragment will be hidden (because of the unresolved dependency). The early culling test may, and in an embodiment does, use information, that is available to it from other stages of the pipeline for this, such as, for example, and in an embodiment, information from a hierarchical culling test (as discussed above), to assist in determining whether the fragment passes (or fails) the test or not, and/or may use, for example, one or more of the techniques described in the Applicant's U.S. Pat. No. 9,454,844(B2) (which is incorporated herein in its entirety by reference) to allow early depth testing to be performed in circumstances where the stored depth values needed for the fragment being tested may not yet be completely up-to-date.

In this mode of operation, if (when) the fragment passes (does not fail) the early culling test (including the case where it cannot be determined with sufficient certainty that the fragment will fail the early culling test), then the fragment is in an embodiment retested for culling purposes at the late culling test stage.

Such a "strong-early" mode of operation will advantageously allow forward progress of fragments even where there are dependencies, and at the same time can, in embodiments at least, be used to try to break up the dependencies without waiting for the dependencies to resolve. It can also be used for fragments that create new dependencies so as to avoid such fragments having to wait for any old dependency to resolve (since the dependency chain will still be intact).

In an embodiment, the first set of state information can in an embodiment also or instead, and in an embodiment also, indicate a "weak-early" mode of operation in which the fragment is to be subjected to an early culling test if it has no dependency on the processing of other fragments, but will be subjected to the late culling test if it does have a dependency on other fragments (i.e. it will be passed into the pipeline for rendering if it has a dependency on the processing of other fragments). In this case, if the fragment is subjected to the early culling test, it can be, and is in an embodiment, culled at that stage if it fails the early culling test (if the early culling test determines that the fragment should be culled).

Such a weak-early mode of operation can be used to avoid having two culling test passes (both early and late), and still allow forward progress even in the case of waiting for dependencies to resolve.

Whether a fragment has a dependency on another fragment or not can be determined in any suitable and desired manner. In an embodiment those fragment and/or sampling positions in the render output for which a dependency exists (e.g. because there is a fragment for that position in the pipeline that is to update the culling test buffer) is tracked, e.g. using an appropriate data structure or mechanism, such as an array of positions, with that dependency tracking information then being used to determine whether a new fragment could have a dependency or not. Other arrangements would, of course, be possible.

The first set of state information can in an embodiment also or instead, and in an embodiment also, indicate a "force-late" mode of operation for culling a fragment, in which case the fragment can only be killed at the late culling test stage (and the early culling test will not be triggered for the purposes of determining whether to cull the fragment or not). In this case, if an early culling test is still run for the purposes of updating the culling test data buffer, and the fragment is found to fail that early culling test, the fragment is still in an embodiment not killed before the late culling test stage (but may, e.g., be marked as needing to be killed later).

In an embodiment, the first set of state information can indicate which one of the above four (force-early, strong-early, weak-early and force-late) modes of operation for performing culling tests to determine whether to cull a fragment is to be performed.

Correspondingly, in an embodiment, the second set of state information that indicates when to determine whether to update the culling test data buffer with data for a fragment based on a culling test operation can indicate a "force-early" mode of operation, in which the fragment will undergo the early culling test (and update the buffer if it passes that early culling test). In an embodiment this mode of operation also requires (and causes) a fragment to be stalled until any dependency that it has on another earlier fragment in the pipeline has cleared before it undergoes the early culling test (again to ensure that the early culling test is reliable and accurate).

The second set of state information can in an embodiment also or instead, and in an embodiment also, indicate a "strong-early" mode of culling operation, in which a fragment will be subjected to the early culling test without waiting for any dependency on another fragment to be resolved for the purpose of determining whether to update the culling test data buffer. In this case, if (when) the fragment does not have any dependency on any other fragment, then the early culling test can be, and is in an embodiment, performed in the normal manner.

On the other hand, if the fragment has a dependency on another fragment, then the early culling test is still performed without waiting for that dependency to be resolved (e.g. for the other fragment to complete its processing and to update the culling test data buffer), but in an appropriately conservative manner and to the extent possible, so as to only identify the fragment as updating the culling test data buffer if it can be determined by the early culling test with the necessary certainty that the fragment will pass the test (because of the unresolved dependency). Again, the early culling test may, for example, use other information, such as information from a hierarchical culling test (as discussed above) to assist in determining whether the fragment passes the test or not, and/or may use, for example, one or more of the techniques described in the Applicant's U.S. Pat. No. 9,454,844 (B2) to allow for early depth testing to be performed in circumstances where the stored depth values needed for the fragment being tested may not yet be completely up-to-date.

In this mode of operation, if (when) it cannot be determined with sufficient certainty that the fragment will pass the early culling test (so as to trigger an update at that stage), then the fragment is in an embodiment retested for updating purposes at the late culling test stage.

Such a "strong-early" mode of operation will advantageously allow forward progress of fragments even where there are dependencies, and at the same time will operate to try to update the data buffer so as to facilitate breaking up of dependencies without waiting for the dependencies to resolve. It can also be used for fragments that create new dependencies so as to avoid such fragments having to wait for any old dependency to resolve (since the dependency chain will still be intact).

This mode of operation will also allow the culling test data buffer to be updated by a new fragment even if the value that it's being updated with may in fact be already outdated because of a dependency (as it will be changed by the dependent fragment that is already in the pipeline) (e.g. if there is a dependency such that the depth buffer will be updated later, the strong-early update mode of operation can still allow the depth buffer to be updated with the, in effect, intermediate value from the new fragment (where it's possible to do that) before the dependent fragment that will update the depth buffer has completed its processing.)

In an embodiment, the second set of state information can in an embodiment also or instead, and in an embodiment also, indicate a "weak-early" mode of operation for updating the culling test data buffer in which the fragment is to be subjected to an early culling test if it has no dependency on the processing of other fragments, but will be subjected to the late culling test if it does have a dependency on other fragments (i.e. it will be passed into the pipeline for rendering if it has a dependency on the processing of other fragments). In this case, if the fragment is subjected to the early culling test, the culling test data buffer can be, and is in an embodiment, updated at that stage if the fragment (a sampling point of the fragment) passes the early culling test.

Such a weak-early mode of operation can again be used to avoid having two culling test passes (both early and late), while still allowing forward progress even in the case of waiting for dependencies to resolve.

The second set of state information can in an embodiment also or instead, and in an embodiment also, indicate a "force-late" mode of operation for updating the culling test data buffer, in which case the culling test data buffer will not be updated even if the fragment undergoes an early culling test (for culling purposes), unless the fragment is culled by the early culling test (in which case the data buffer can be updated (depending on the data type in question (e.g. stencil values may update in the case of a culling, but depth values should not)). Otherwise, the fragment undergoes the late culling test for the purposes of determining whether and how to update the culling test data buffer based on the fragment.

In an embodiment, the second set of state information can indicate which one of the above four (force-early, strong-early, weak-early and force-late) modes of operation for performing culling tests to determine whether to update the culling test data buffer with data for a fragment is to be performed.

It will be appreciated from the above, that depending upon the modes of operation selected for the purposes of both determining whether to cull a fragment and whether and how the fragment is to be used to update the culling test data buffer, it may be that a given fragment will be triggered to undergo an early culling test for both operations, a late culling test for both operations, or an early culling test for one of the operations and a late culling test for the other of the operations.

In the case where a fragment is to undergo a different culling test for each operation (i.e. one operation will use an early culling test and one operation will use a late culling test), then, in an embodiment, the result of the specified culling test operation is used to determine whether to cull the fragment, and the result of the specified operation is used to determine whether to update the data buffer with data for the fragment, even if the result of one test (e.g. the early test) could in theory be used to decide the result for both operations. Thus, the fragment will (in the normal course) be culled or update the culling test data buffer at the point (time) specified for that operation by the set of state information in question, irrespective of whether, e.g. an earlier test, has been performed.

In the case where a fragment is to undergo the same culling test for both operations (i.e. both operations will use an early culling test or both operations will use a late culling test), then the fragment in an embodiment subjected to the (early or late) culling test only once, and the result of that culling test is then used appropriately for each separate operation (culling and data buffer updating). It will also accordingly be appreciated in this regard, that depending upon the mode of operation indicated, the same culling test result may result in different operations in respect of deciding whether to cull a fragment or not, and in respect of deciding whether to update the culling test data buffer based on the result of the culling test. (In general, the test results will be considered and acted upon separately.)

It will also be appreciated from the above that in some cases an early culling test will be performed where a fragment has an unresolved dependency on another fragment that is already in the pipeline, such that the early culling test may not be able to be performed with complete accuracy because the data for the fragment that is already in the pipeline is not yet present in the culling test data buffer. In this case, as discussed above, the early culling test is in an embodiment performed to the extent possible given the information that is available to it.

For example, as discussed above, one or more of the techniques described in the Applicant's U.S. Pat. No. 9,454,844 (B2) may be used to determine if the early culling test can be reliably performed for the fragment at that stage, notwithstanding the unresolved dependency.

Similarly, information from other culling test stages, such as a hierarchical culling test stage (as discussed above), may be used for this purpose. For example, and in an embodiment, where the graphics processing pipeline includes a hierarchical culling test operation, then that hierarchical culling test operation can in an embodiment signal (e.g. flag) fragments that from its test will be known to pass the early culling test (e.g. even if all the data required for that test is not present), and such a "known to pass" (or "known to fail") signal can be used at the early culling test stage as appropriate.

Thus, in an embodiment, the graphics processing pipeline includes a further early culling test operation operable to perform an early culling test on fragments (and in an embodiment on groups of plural fragments) generated by the rasteriser before the fragments are subjected to the early culling test that is configured and controlled in the manner of the technology described herein, which further early culling test is further operable to provide, when it determines that a fragment or set of plural fragments that it has tested will definitely pass the culling test, a signal that the fragment or set of fragments will pass the early culling test to the early culling tester that is operated in the manner of the technology described herein, and the early culling tester that is operable in the manner of the technology described herein is operable to use such a signal from the further early culling test when performing its early culling test when determining (to determine) whether a sampling point and/or fragment will pass its early culling test.

Correspondingly, the early culling tester of the technology described herein is in an embodiment operable to use information received from another early culling test of the graphics processing pipeline when performing an early culling test on fragments generated by the rasteriser, so as to use that information from the further early culling tester to assist in its determination of whether a sampling point and/or fragment passes the early culling test or not.

In an embodiment, particularly where the graphics processing pipeline includes a hierarchical rasterisation arrangement as discussed above, the graphics processing pipeline, and in an embodiment the hierarchical rasteriser, is operable to keep track of possible outcomes of any pending culling test data (e.g. depth and/or stencil) updates, in an embodiment using range logic, and the early culling tester is in an embodiment then operable to use the tracked update outcome information from the, e.g., range logic, to determine whether a sampling point, etc., will pass its early culling test.

Thus, in an embodiment, the early culling tester of the technology described herein is operable to use information about possible outcomes of pending culling test data buffer updates received from another stage of the graphics processing pipeline (and in an embodiment from a hierarchical rasteriser) when performing an early culling test on fragments generated by the rasteriser, so as to use that information to assist in its determination of whether a sampling point and/or fragment passes the early culling test or not.

The sets of state information provided for a fragment may be used in any suitable and desired manner to control the respective culling tests and operations, etc. In an embodiment, the graphics processing pipeline is operable to (and comprises processing circuitry operable to) determine from the first set of state information indicative of a culling test operation to be used to determine whether to cull the fragment provided for a graphics fragment, the culling test operation to be performed to determine whether to cull the fragment or not, and to configure and cause the pipeline to perform the indicated culling test operation to determine whether to cull the fragment or not accordingly (and correspondingly for the second set of state information).

The state information can be read (determined) and the graphics processing pipeline configured in any suitable and desired manner, e.g., and in an embodiment, in the normal manner for configuring the graphics processing pipeline based on state information for the graphics processing system in question. Thus the graphics processing pipeline and graphics processing system in an embodiment comprises, e.g., an appropriate controller (control unit) that is operable to read state information indicative of the required operation of the graphics processing pipeline, and to configure the graphics processing pipeline in accordance with the read state information. Other arrangements would, of course, be possible.

It will be appreciated from the above, that in the embodiments of the technology described herein at least, the first and second sets of state information can each indicate which of a plurality of different modes of operation should be used for a fragment or fragments (e.g. for a given draw call). The graphics processing system of the technology described herein accordingly in an embodiment also operates to (and comprises processing circuitry operable to) select which of the different modes of operation to use for a fragment or fragments (e.g., and in an embodiment, for a given draw call) (and then operates to set the state information for the fragment or fragments (e.g. draw call) accordingly).

The determination and selection of which mode or modes of operation to use for a given fragment, etc., can be performed in any suitable and desired manner. It is in an embodiment based on (and in accordance with) one or more particular, in an embodiment selected, in an embodiment predetermined criteria, e.g., and in an embodiment, relating to the graphics processing that is to be performed for the fragment, etc. (e.g. draw call).

In an embodiment, the selection of which mode of operation to use is based, at least in part, upon the graphics processing operations that are to be performed when processing the fragment(s), and in particular, any operations that are specified by the application that is requesting the graphics processing. Thus, in an embodiment, the selection of which mode of operation to use for culling a fragment and for updating the culling test data buffer using a fragment is, at least in part, based on the operations (API operations) specified for the graphics processing that is to be performed.

Thus, in an embodiment, the graphics processing system is operable to (and comprises processing circuitry operable to) select when a culling test operation to be used to determine whether to cull a fragment is to be performed, and when to determine whether to update a culling test data buffer with data for a fragment based on a culling test operation, based on graphics processing operations that are to be performed when processing the fragment, and to provide first and second sets of state information, respectively, indicative of the culling test operation selected to be used to determine whether to cull the fragment, and indicative of the culling test operation selected to be used to determine whether to update the culling test data buffer with data for the fragment, for a fragment accordingly.

As discussed above, this operation is in an embodiment performed on a draw call basis, and so will consider the graphics processing operations to be performed for a given draw call (for, e.g., a set of plural primitives), and then select the culling test operations and set the state information for the draw call (e.g. set of plural primitives) accordingly.

In an embodiment, the mode of operation to use for a fragment, etc., is selected and set based on at least one of, and in an embodiment plural of, and in an embodiment all of, the following:

any shader program that is to be executed when processing the fragment (e.g., and in particular, the operations that the shader program is to perform, such as one or more of whether the shader has side effects, contains conditional fragment (sampling point) kill instructions, comprises instructions that could modify the coverage of a fragment, and/or includes an alpha test);

whether the processing of the fragment is being used for occlusion query purposes;

whether and how the depth test that fragments are to undergo changes for the set of fragments (e.g. draw call) that the fragment belongs to (e.g., whether it changes from a more than test to a less than test (and vice-versa), and/or changes from a less than (or more than) test to a less than or equal to (more than or equal to) test and vice-versa);

whether the rendered fragment data for a fragment is to be blended with other rendered fragment data or not (or is, e.g., simply to overdraw any other rendered fragment data); and any application specified culling test operations.

In an embodiment, the selection of the operation to perform for a fragment, etc., is also or instead, and in an embodiment also, based on how the culling test data values (e.g. depth and/or stencil values) for the fragments will be generated, and in particular, whether the source of those values is a shader program or not (i.e. whether the depth and stencil values will be generated through execution of a shader program, or are "fixed" values (and so will not change during the rendering operation).

Correspondingly, in an embodiment, the control of the culling test operation and culling test buffer updates for a fragment, etc., using the first and second sets of state information is selectively performed based on how the culling test data (e.g. depth and/or stencil values) for the fragments is being generated.

Thus, in an embodiment, for any culling test data values that are generated by a shader program (have a shader program as their source), then the culling tests are not based on the state information, but instead the fragments always undergo late culling tests (both for culling and updating purposes) with respect to the culling test data values that are being provided by executing the shader program.

Conversely, in an embodiment, in the case where the culling test (e.g. depth and/or stencil) data values are provided as fixed values (will not be changed by the fragment processing in the graphics processing pipeline), then the fragments are processed in accordance with the sets of state information.

In the case where fragments may have both fixed and shader-generated culling test data values, then in an embodiment, the fixed values are processed in accordance with the first and second sets of state information provided for a fragment, but the shader-generated values are used (only) for late culling testing (which may mean that there is a need to perform a repeated late test for the shader output).

The modes of operation to set for the purposes of determining whether to cull a fragment and whether to update the culling test data buffer using the data of a fragment can be selected in any suitable and desired manner based on, e.g., and in an embodiment, one or more of the above discussed conditions.

In an embodiment, considering the four different modes of operation discussed above, fragments are in an embodiment, wherever possible, set to use the "strong-early" update mode of operation. This is advantageous, because it can allow the culling test data (e.g. depth) buffer to still be updated by a fragment, even when that fragment has a dependency on an earlier fragment. This mode of operation can accordingly allow dependencies to be resolved faster. It can also, for example, and as will be discussed further below, in embodiments be used to trigger the killing of fragments that are already in the pipeline in the event that the early culling test triggers an update of the culling test data buffer.

In an embodiment, for graphics processing operations that have no side effects, no shader modifying coverage and the depth/stencil source is not the shader, then the above "force early" modes of operation are used both for the fragment culling and the fragment updating operations.

Shader programs with side effects in an embodiment do not use the strong-early or weak-early culling mode of operation, and in an embodiment have force-late culling if not using the "force-early" mode of operation.

A number of use cases for particular combinations of modes of operation are described in more detail below.

While it would be possible to configure the system such that the mode of operation set by the state information that is provided for a fragment must be performed regardless, in an embodiment, the state information provided for a fragment can be overridden in use, e.g., and in an embodiment, as fragments that the state information relates to are being processed. In an embodiment, when the operation indicated by the state information provided for a fragment is to be "overridden", the fragment is then processed according to, e.g., and in an embodiment, a particular, in an embodiment selected, in an embodiment defined, default mode of operation.

This could be achieved by changing the state information for a fragment or fragments when the "override" situation is identified, but in an embodiment is achieved by setting an "override" indicator (e.g. flag) when the override situation occurs.

In an embodiment the state information override "indication" (flag) is maintained per tile in the case of a tile-based graphics processing system and reset when a new tile is commenced. Other arrangements would, of course, be possible.

The default mode of operation that is performed when the "override", e.g. flag, is set, could be any desired and suitable mode of operation. In an embodiment, it is the "weak-early" mode of operation (as described above).

In a particular such arrangement, the state information and accordingly the modes of operation for fragments can be, and are in an embodiment, changed if the culling test (e.g., and in an embodiment, depth test) that the fragments are being subjected to changes during processing of the sequence of fragments that the state information relates to, and in particular if the direction of the depth test changes (i.e. from being a greater than to a less than test or vice-versa). In this case, as a change in the depth test comparison function would normally mean that the early depth test can no longer be reliably carried out, then the, e.g. flag, that overrides the state information is in an embodiment set (and, as discussed above, in an embodiment causes any setting of a "strong-early" test to be performed as a "weak-early" test).

In an embodiment, the state information override indication (flag) can also be, and is also, set where occlusion queries are used with a "strong-early" test and the query is not answered early, and/or if a shader program reads the depth or stencil values.

The determination and setting of the state information for a fragment or fragments (e.g. draw call) can be performed by any suitable and desired element and unit of the graphics processing system. In an embodiment, this is done by the driver for the graphics processing pipeline (as it will be the driver that receives the instructions for graphics processing from the application that requires the graphics processing and can therefore interpret those instructions appropriately to set the state information). Thus, in an embodiment, the driver for the graphics processing pipeline is operable to, and operates to, determine from requests, e.g. commands (API calls) and/or data, received from an application for graphics processing, a mode of operation to use for determining whether to cull fragments or not, and a mode of operation to use for determining whether to update the culling test data buffer using data for a fragment, and then sets and provides the first and second sets of state information for the fragments (e.g. draw call) accordingly.

It is believed that such operation of a driver for a graphics processing pipeline may be new and inventive in its own right.

Thus, a further embodiment of the technology described herein comprises a method of operating a driver for a graphics processing pipeline, the method comprising:

the driver, for at least one graphics fragment to be processed:

determining from requests received for graphics processing operations from an application that requires graphics processing by the graphics processing pipeline that the driver is a driver for:

when a culling test operation to use for determining whether to cull the at least one graphics fragment should be performed; and when a determination of whether to update a culling test data buffer using data for the at least one graphics fragment based on a culling test operation should be performed; and providing for the at least one graphics fragment:

a first set of state information indicative of the culling test operation selected to be used to determine whether to cull the at least one fragment; and a second set of state information indicative of the culling test operation selected to be used to determine whether to update the culling test data buffer with data for the at least one fragment.

In these embodiments of the technology described herein, the driver in an embodiment operates to determine and set the state information for a fragment or fragments being processed (e.g. and in an embodiment for respective draw calls) in one or more or all of the manners discussed above. The requests for graphics processing may comprise commands, such as API calls.

In an embodiment, the technology described herein can also use, and in an embodiment does also use, the result of a sampling point passing the early culling test to determine if the processing of another sampling point that is being processed in the graphics processing pipeline can be stopped, for example, and in an embodiment, in the manner of the Applicant's U.S. Pat. No. 9,153,070 (which is incorporated herein in its entirety by reference). In other words, the technology described herein in an embodiment extends the effect of the early cull testing at or after the rasterisation stage to allow it to also, potentially, cull sampling points of primitives that have already been rasterised and sent to the rest of the pipeline for processing.

This then means that the results of the early culling test can be used to avoid and/or stop processing (to "kill") sampling points for primitives that have previously passed that test and are already in the pipeline, rather than simply to stop sampling points for new primitives (e.g. that will be occluded) from being rendered. This has the advantage, e.g., that the processing of sampling points in the pipeline for primitives that have previously passed the early cull test can still be stopped if a fragment for a later primitive that will occlude them is generated before their processing has been completed.

Thus, in an embodiment, the method of the technology described herein further comprises:

when an early culling test is performed in respect of at least one sampling point associated with a fragment generated by the rasteriser before the fragment is sent to the renderer for processing:

when the at least one sampling point passes the early culling test, sending the fragment onwards for processing and determining if the processing of another sampling point that is in the graphics processing pipeline can be stopped as a consequence of the at least one sampling point passing the early culling test.

Correspondingly, the graphics processing pipeline of the technology described herein is in an embodiment further configured to (and, e.g., and in an embodiment, the early culling tester is operable to):

in response to at least one sampling position associated with a fragment generated by the rasteriser passing the early culling test, send the fragment onwards for processing and provide information for determining if the processing of another sampling position that is in the graphics processing pipeline can be stopped as a consequence of the at least one sampling position passing the early culling test.

This operation could be triggered whether the early culling test is being performed for fragment culling or data buffer updating purposes, or it could be performed in respect of only one of those operations. In an embodiment, this operation is performed (at least) when the at least one sampling point for a fragment passes an early culling test that has been performed (used) for the purposes of determining whether to update the culling test data buffer with data for the fragment or not. Other arrangements would, of course, be possible.

This process may be carried out in any suitable and desired manner, but in an embodiment is done by comparing the (e.g. (x, y)) positions of one or some or all of the sampling points and/or fragments currently occupying the pipeline stage with the (e.g. (x, y)) position(s) of the sampling point(s) and/or fragment(s) that passed the early culling test.

In an embodiment, the event of a sampling point or fragment passing the early culling test triggers the broadcasting of information, such as, and in an embodiment, the position of the sampling point or fragment(s) that pass the test, to other, e.g. later, stages in the processing pipeline, with those other, e.g. later, stages in an embodiment then using that broadcast "pass" information to assess whether any of the sampling points or fragments that they are currently handling can have their processing stopped (e.g., and in an embodiment, in the manner discussed herein).

Thus, in an embodiment, the graphics processing pipeline is configured to, if (when) at least one sampling point associated with a fragment passes an early culling test, broadcast information relating to the at least one sampling point (and/or fragment in question) that has passed the early culling test, to at least one, in an embodiment other (and in an embodiment later), stage of the graphics processing pipeline, and the at least one stage of the graphics processing pipeline is configured to use the broadcast information associated with the at least one sampling point and/or fragment that pass the early cull test to determine if the processing of any fragments and/or sampling points associated with fragments that are currently at that stage can be stopped.

The (later) stage or stages of the graphics processing pipeline that the "pass" information is broadcast to can be any suitable and desired stage or stages of the graphics processing pipeline. They are in an embodiment a stage or stages of the graphics processing pipeline where fragments could be culled usefully, if desired. In an embodiment, the early culling test "pass" information is broadcast (at least) to the renderer (the shader pipeline) and/or to a part or parts of the renderer of the graphics processing pipeline.

While it would be possible simply to discard (stop the processing of) any sampling points and/or fragments found, e.g., to be overdrawn or occluded by the sampling points and/or fragment(s) that pass the early culling test, in an embodiment the determination of whether a sampling point and/or fragment can be discarded from further processing or not is subject to further checks and/or criteria. For example, it is in an embodiment also checked whether a sampling point and/or fragment in the pipeline potentially to be discarded (e.g. that will be occluded) should still be processed for any other reason, e.g., because it has a side effect that is still needed, such as being associated with an occlusion query that it is still needed for.

Thus, in an embodiment, if a fragment (or sampling point) is found to be overdrawn or occluded by a fragment or fragments (or sampling point) that passes the early culling test, other properties of the fragment (or sampling point) are first checked to see if the fragment (or sampling point) should still be processed, before stopping its processing. This check in an embodiment comprises determining if the fragment (or sampling point) is still needed for an occlusion query (has an active occlusion query attached to it) or for other side effects (in which case it should not be discarded), and/or whether the fragment (or sampling point) has been marked (e.g. flagged) as being able to be culled in this manner (or not), etc.

The sampling points and/or fragments whose processing it is determined may be stopped can have their processing stopped and/or omitted in any desired and suitable fashion. In an embodiment this is done by marking the so-identified sampling points and/or fragments as being "killed" (invalid), with the relevant processing stages then checking if a sampling points and/or fragment has not been killed (is valid) before doing any further processing on it. This will then avoid and/or stop any unnecessary processing of these sampling points and/or fragments.

In the case of sampling point, a sampling point is in an embodiment marked as invalid by setting its value in a coverage mask for the fragment in question appropriately.

While the operation in the manner of the technology described herein (to potentially "kill" other fragments, etc., in the graphics pipeline) could be performed in respect of each and every fragment that passes the early culling test (that is associated with a sampling point that passes the early culling test), in an embodiment it is carried out in respect of selected fragments only, in an embodiment fragments that meet certain selected, in an embodiment predetermined, criteria (and that pass the early culling test(s)).

The early culling test(s) (culling test stage(s)) can be configured to operate in the above manner in any suitable and desired manner. In an embodiment, the culling test stages comprise combined test and update logic that is operable to carry out the culling test, and to, if the culling test is passed, and the fragment meets any required criteria (such as overwriting data from previous fragments, such as being opaque), "broadcast" the pass event and the necessary information associated with that to the appropriate stages of the graphics pipeline.

In some embodiments, the graphics processing pipeline comprises, and/or is in communication with, one or more memories and/or memory devices that store the data described herein and/or store software for performing the processes described herein. The graphics processing pipeline may also be in communication with a host microprocessor, and/or with a display for displaying images based on the data generated by the graphics processing pipeline.

The graphics processing pipeline is in an embodiment implemented and executed by a graphics processor (graphics processing unit) that includes appropriate functional units for executing the stages of the graphics processing pipeline. The graphics processing pipeline stages may be implemented via fixed function units (hardware) of the graphics processing unit and/or by appropriately programmed programmable functional units of the graphics processing unit, as desired.

As will be appreciated from the above, the graphics processing pipeline is in an embodiment part of a graphics processing system that includes a host processor (central processing unit (CPU)) that may be, and is in an embodiment, operable to execute applications that can require graphics processing by the graphics processing pipeline (GPU), and that will send appropriate commands and data to the graphics processing pipeline (GPU) to control it to perform graphics processing operations and to produce graphics processing (render) output required by applications executing on the host processor (including in the manner of the technology described herein).

To facilitate this, the host processor should, and in an embodiment does, also execute a driver for the graphics processing pipeline (graphics processing unit) that will be operable to receive and interpret commands and data received from an application executing on the host processor for graphics processing operations and to convert those commands and data to appropriate commands and data for provision to the graphics processing pipeline (GPU) so as to cause the graphics processing pipeline to perform the desired graphics processing operation.

The host processor in an embodiment also executes a compiler or compilers for compiling shader programs to be executed by programmable shading stages of the graphics processing pipeline (GPU) (which compiler may be, and in an embodiment is, a part of the driver).

The graphics processing system correspondingly in an embodiment comprises one or more memories and/or memory devices for storing the data described herein and/or for storing software for performing the processes described herein. It in an embodiment also comprises a display for displaying images based on the data generated by the graphics processing pipeline.

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

Correspondingly, although the technology described herein has primarily been described above with reference to the processing of a given fragment, as will be appreciated by those skilled in the art, the technology described herein may be, and is in an embodiment, applied to plural fragments that are to be processed, e.g. to each fragment of a draw call, and to each draw call of a render output to be generated, and so on.

Thus, the technology described herein is in an embodiment used to configure and control the performing of early and late culling tests when processing primitives and fragments to generate a useful render output, such as, and in an embodiment a frame (image) for display.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems. Thus, in an embodiment, the graphics processing system is a tile-based graphics processing system.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and units of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows a typical graphics processing system. An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3.

The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 can perform a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test can be carried out.

Fragments that pass (or that aren't subjected to) the fragment early Z and stencil test stage 26 are then sent to the fragment shading stage 27. The fragment shading stage 27 performs the appropriate fragment processing operations on the fragments, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by appropriately comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

FIG. 3 shows schematically the depth and stencil testing arrangement of the graphics processing pipeline shown in FIG. 2 in more detail.

FIG. 3 shows schematically the pipeline stages after the graphics primitives (polygons) 42 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 3.

As shown in FIG. 3, this part of the fragment processing pipeline of the graphics processor 3 includes a number of processing stages, including the rasterisation stage 25, an early hierarchical ZS (depth and stencil) test stage 40, the early ZS (depth and stencil) stage 26, a rendering stage in the form of a fragment shading stage 27, and the late ZS (depth and stencil) test stage 28.

The rasterisation stage 25 operates to rasterise the primitives making up the render output (e.g. the image to be displayed) into individual graphics fragments for processing. To do this, the rasteriser 25 receives graphics primitives 42 for rendering, rasterises the primitives to sampling points and generates graphics fragments having appropriate positions (representing appropriate sampling positions) for rendering the primitives. In the present embodiment, each graphic fragment that is generated by the rasteriser 25 represents (has associated with it) plural (and normally 4) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 25 is a hierarchical rasteriser that operates to iteratively test primitives against progressively smaller patches of sampling points (and thus, correspondingly, patches of fragments) down to a minimum patch size corresponding to a 2×2 group of fragments (i.e. to an array of sampling points that would be rasterised to a 2×2 group of fragments), discarding any patches that do not (at least in part) cover the primitive. Each patch that is tested corresponds to a given set of fragments.

This is done by the rasteriser 25 starting with a large patch of the render target area and testing if the primitive in question is inside that patch. If not, the entire patch is discarded, and the next patch tested, and so on. On the other hand, if a primitive is found to be within the patch (to cover, at least in part, the patch), the patch is sub-divided into 4 parts, and each "sub-patch" is then tested in the same way, and so on, until the minimum patch size is reached.

Once the minimum patch size has been reached (i.e. a patch of 2×2 fragments that covers, at least in part, the primitive has been identified), the rasteriser 25 then tests the individual sampling points in that final patch to see if the sampling points are covered by the primitive. The rasteriser 25 then generates and outputs individual fragments for rendering corresponding to the sampling points found to be covered by the primitive.

The rasteriser 25 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

Other rasterisation arrangements would, of course, be possible.

As shown in FIG. 3, the rasteriser 25 also has an early "hierarchical" depth (Z) and stencil testing stage 40 associated with it. This hierarchical depth and stencil testing stage 40 performs "early" depth and stencil tests on the patches generated by the rasteriser 25 to see if those patches can be culled.

To do this, each patch of sampling points (of fragments, in effect) generated by the rasteriser is sent to the early hierarchical depth and stencil test stage 40, which then performs a Z (depth) test on the patch of sampling points (of fragments) to see if the patch can be discarded (culled) at this stage. To do this, the early hierarchical depth and stencil tester 40 derives a depth value range for each patch it receives from the rasteriser 25 by taking appropriate depth samples across the patch, and compares that depth value range with a previously derived and stored depth value range associated with the sampling (fragment) positions that the patch covers, to try to determine whether the patch will be occluded by or overdraw other fragments and sampling points to be rendered (e.g. that are further on in the pipeline or that have already been rendered) or not. At the same time, an early stencil test is carried out.

If the patch being tested fails the early depth and stencil test, it is discarded (culled) from any further processing.

If the patch being tested passes the early depth and stencil test, it is returned to the rasteriser 25 for further subdivision into smaller, "sub-patches", as discussed above. Each "sub-patch" is then returned to the hierarchical early depth and stencil tester 40 for testing, and so on, until the minimum patch size is reached.

In the present embodiment, the early hierarchical depth and stencil testing stage 40 is also operable to provide a signal indicative of whether a patch has been determined to be certain to pass the early depth and stencil test or not. This may be provided, e.g., by setting an appropriate state bit for the patch and/or fragments generated from the patch appropriately. This "known to pass" signal can then be used, as will be discussed further below, by the early depth and stencil testing stage 26 to determine whether a given fragment passes that test even in the event where there is a dependency and the depth and stencil buffer may not have been fully updated.

The depth value ranges that are used by the early hierarchical depth and stencil testing stage 40 when performing depth and stencil tests on patches of plural sampling points that it receives from the rasteriser 25 are stored in the depth and stencil buffers 5. A range of depth values (and a stencil value) is stored in the depth and stencil buffer 5 for each patch size and position that the buffer represents (essentially for each patch size and position that the rasteriser 25 could generate for the tile that is being processed).

The depth value range that is stored for each patch is initially set to a default value, or to an expected depth value range for the patch if that can be determined. (In some arrangements, the range of possible depth values that primitives for a tile may have may be known in advance. This can then be used to populate the depth buffer 5 with ranges of expected depth values for the patches in question.) The stored patch depth value ranges are then updated as patches and/or sampling points being tested by the early hierarchical depth and stencil testing stage 40, the early depth and stencil testing stage 26, and the late depth and stencil testing stage 28, pass the respective depth and stencil tests.

Storing expected ranges of depth values for patches of plural sampling point positions (and thus fragments) of a tile being rendered in the depth and stencil buffer 5 means that the early hierarchical depth and stencil tester 40 can still carry out a depth and stencil test in respect of patches of sampling point positions generated by the rasteriser 25 even if earlier fragments that are already in the pipeline having the same position have not completed any depth or stencil test yet (e.g. did not undergo the early hierarchical depth and stencil test 40 and the early depth and stencil test 26, and have yet to undergo the late depth and stencil test 28). This is because the ranges of expected depth values can be used to determine which possible outcomes the depth test (e.g.) may have, even if a depth test in respect of earlier fragments has not yet been performed. This then allows the early hierarchical depth and stencil test 40 to be used to (potentially) stop the processing of earlier fragments that are in the pipeline in the manner of the technology described herein even if those earlier fragments have not in fact undergone a depth or stencil test yet.

Storing and testing ranges of depth values for patches of sampling point positions means that larger patches of sampling point positions can readily be subjected to an early depth and stencil test (as the stored ranges allow the test to determine if the patch will be entirely outside the stored range and thus, for example, pass the early hierarchical depth and stencil test in its entirety). This then facilitates, as will be discussed further below, broadcasting an early depth and stencil test pass event that affects a much larger area of the render target in a single processing cycle, such that it may then be possible to (potentially) stop the processing of an entire group of fragments within the patch area in one processing cycle (instead of, e.g., having to potentially stop the processing of each fragment one-by-one).

The early hierarchical depth and stencil test stage 40 is configured to operate in an appropriately conservative manner.

Once the minimum patch size is reached (a patch of 2×2 fragments in this embodiment), the rasteriser 25 issues fragments that represent the patches (and thus sampling points) that pass the early hierarchical Z and stencil test stage 40 to the remainder of the graphics processing pipeline for processing.

The first part of this processing is that each fragment issued (output) by the rasteriser 25 can be subjected to an early depth and stencil test in the early depth and stencil test stage 26. This early depth and stencil test stage 26 performs depth and stencil tests on the individual (covered) sampling positions associated with the fragments issued by the rasteriser 25 (i.e. at a per-sampling point resolution).

To do this, the early depth and stencil tester 26 uses per-sampling position depth and stencil values stored in the depth and stencil buffers 5. Thus, the depth and stencil buffers 5 store, in addition to the per-patch depth value ranges, an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 26 and the late depth and stencil testing stage 28 pass the respective depth and stencil tests.

The depth and stencil buffers 5 are configured as two distinct buffers (although they may be in the same physical memory) in this embodiment, one buffer storing per-patch depth ranges, and the other storing per-sample depth values. Other arrangements would, of course, be possible.

The early depth and stencil test stage 26 is again configured to operate in an appropriately conservative manner.

Fragments that pass the early depth and stencil test stage 26 (i.e. fragments having at least one associated sampling position that passes the early depth and stencil test stage 26), or that are not subjected to the early depth and stencil test stage 26, are then sent onwards to the fragment shading stage 27 (the renderer) via a "queue" 12 (the function and purpose of this queue 12 will be discussed in more detail below), as shown in FIG. 3.

(Fragments that fail the early depth and stencil test stage 26 are culled by the early depth and stencil test stage 26.)

The fragment shading stage 27 performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 27 is in the form of a shader pipeline (a programmable fragment shader), but other arrangements, such as the use also or instead of fixed function fragment shading units would be possible, if desired.

There is then a "late" fragment Z and stencil test stage 28, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading stage 27 should be stored in the tile buffers (should replace or modify the fragment data in the tile buffer(s) of the fragments that have already been rendered)).

To do this, the late depth test stage 28 compares the depth values of (associated with) the fragments issued from the fragment shading stage 27 with the (per-sampling position) depth values stored in the depth buffer 5 for the sampling positions in question (in the appropriate manner). The depth values for sampling points that pass the late depth test 28 are also written appropriately to the Z-buffer 5 to update it.

This late fragment depth and stencil test stage 28 also carries out any necessary "late" alpha and/or stencil tests on the fragments.

The fragments that pass (or that don't undergo) the late fragment test stage 28 are then subjected to any remaining operations necessary on the fragments, such as blending with the framebuffer, dither etc. (not shown).

Finally, the output fragment data values are written to the appropriate tile buffers 30 that store an appropriate, e.g. colour, value for each sampling point that the buffers represent (in essence for each sampling point of the tile that is being processed).

Once each tile has been processed, its data is, e.g., exported from the tile buffers 30 to a main memory (e.g. to a frame buffer in a main memory) (not shown) for storage, and the next tile is then processed, and so on, until sufficient tiles have been processed to generate the entire render output (e.g. frame (image) to be displayed).

As shown in FIG. 3, the present embodiment also uses the result of a patch passing the early hierarchical depth test 40, or of a fragment passing the early depth test 26, respectively, to determine if the processing of other fragments that are in the graphics processing pipeline can be stopped (i.e. determines if older fragments can be "killed" because they will be completely overdrawn by new fragments on the same position).

To do this, as shown in FIG. 3, the early hierarchical depth and stencil testing stage 40 and the early depth and stencil testing stage 26 are configured to, if a patch of fragments, or a fragment, respectively, passes the respective early culling test, not only pass the patch or fragment on to its next stage in the processing pipeline, but also to broadcast information relating to that early culling test "pass" event to stages of the pipeline (as shown by the dashed lines 9, 10, 11, 14 in FIG. 3).

In the present embodiment, when a patch of sampling points passes the early hierarchical depth test 40, the early hierarchical depth and stencil test stage 40 broadcasts 9, 10, 11, the (x, y) positions covered by the patch that passed the test to the queue 12, the fragment shading stage 27, the rasteriser 25, and the early hierarchical depth and stencil testing stage 4 itself (as shown by the dashed line 11 in FIG. 3). As will be discussed below, these stages of the graphics processing pipeline then use that position information to assess whether any of the fragments that they are currently handling can have their processing stopped.

As well as broadcasting the early hierarchical depth test pass event to other stages of the graphics processing pipeline, the early hierarchical depth (Z) and stencil testing stage 40 is also configured to update the depth and stencil buffers 5 with the relevant depth value range and/or stencil values for the patch of sampling points that has passed the early hierarchical depth test. This then allows those buffers to contain an up-to-date record of the, e.g., depth value ranges of the patches that have undergone (and passed) the early hierarchical depth and stencil test 40, thereby making the early hierarchical depth and stencil tests more efficient.

This updating of the depth buffer, etc., is carried out in an appropriately conservative fashion, so as to avoid any risk that the updates could cause errors in the processing of patches, etc.

Correspondingly, in the present embodiment, when a fragment passes the early depth test 26, the early depth and stencil test stage 26 broadcasts 14 the (x, y) positions covered by the fragment that passed the test to the queue 12, and to the fragment shading stage 27 (as shown by the dashed line 14 in FIG. 3). As will be discussed below, these stages of the graphics processing pipeline again then use that position information to assess whether any of the fragments that they are currently handling can have their processing stopped.

Again, as well as broadcasting the early depth test pass event to other stages of the graphics processing pipeline, the early depth (Z) and stencil testing stage 26 is configured to update the depth and stencil buffers 5 with the relevant depth values and/or stencil values for the sampling points associated with fragments that pass the early depth test. This then allows those buffers to contain an up-to-date record of the, e.g., depth values of the sampling points that have undergone (and passed) the early depth and stencil test 26, thereby making the early and late depth and stencil tests more efficient.

The broadcasting of the culling test "pass" event and the updating of the depth buffers etc., is not carried out for all patches and fragments that pass the early hierarchical depth test 40 and early depth test 26 in the present embodiment, but is only performed for patches and fragments that meet certain criteria. This is so as to avoid erroneously discarding fragments in the pipeline when a later fragment passes an early depth test.

The present embodiment uses an "auto-detection" scheme in the early hierarchical depth and stencil test unit 40 and in the early depth and stencil test unit 26 to determine if an early depth test "pass" event should be broadcast to the pipeline or not. This auto-detection scheme has the following requirements for broadcasting (sending) an early depth test "pass" event to the pipeline: the new patch or fragment must have passed the early z/s test (and be processed by the early z/s test and not the late z/s test); the new patch or fragment must have a full rgb writemask (z/stencil is already written to) and a blend function not dependent on previous rgba values; the shader for the new patch or fragment cannot read from the tilebuffer and the new patch or fragment must not have late z update forced.

Other arrangements, such as the use of "allow-to-kill" and "allow-to-be-killed" flags for fragments (etc.), would, of course, be possible.

The early hierarchical depth and stencil testing stage 40 and the early depth and stencil testing stage 26 comprise combined test and update logic that is operable to carry out the culling tests, and to, if the tests are passed, and the patch or fragment meets the required criteria, "broadcast" the pass event and the necessary position information associated with that to the appropriate stages of the graphics pipeline, and to update the, e.g., depth information in the depth buffer(s), etc.

In response to the early depth test "pass" event position information broadcast by the early hierarchical depth and stencil testing stage 40 and the early depth and stencil testing stage 26, the stages of the processing pipeline that receive that information then use that information to determine whether any fragments that they currently contain need no longer be processed as a consequence of the early cull test "pass" event. This process is carried out by comparing the (x, y) positions of all of the fragments currently occupying the pipeline stage with the (x, y) position(s) of the fragment(s) and/or patch that passed the early culling test broadcast by the early hierarchical depth and stencil test stage 40 or the early depth and stencil test stage 26 (as this will, in effect, identify any fragments that are currently in the stage that will be occluded by the patch or fragment that passed the early depth and stencil test).

The processing of any current fragments that have the same (x, y) positions as the patch or fragment(s) that passed the early culling test is then stopped, subject to certain other criteria for stopping the fragment's processing also being met. In particular, it is also checked whether the fragment in the pipeline potentially to be discarded (i.e. that will be occluded) should still be processed for any other reason, e.g., because it has a side effect that is still needed, such as being associated with an unresolved occlusion query. If the fragment that is occluded does not have a still-active occlusion query attached to it (and has no other required side effects), it is discarded (its processing is stopped), but if it does have an active occlusion query (or some other still required side effect) attached to it, is not discarded (i.e. its processing is continued). This check is performed by the stage of the graphics processing pipeline in question.

The determination of the fragments that need no longer be processed in the event of an early culling test "pass" event is carried out in an appropriately conservative manner, to reduce the risk of incorrectly discarding fragments from further processing.

Each stage of the graphics processing pipeline tests all of the fragments in the stage in parallel. This allows the pipeline stages to discard fragments at the same rate as which early cull testing pass events can generate potential culling opportunities.

The fragments in the later processing stages have their processing stopped by marking the so-identified fragments as being "killed" (invalid). To facilitate this, each fragment has a "killed" bit associated with it (e.g. as part of its associated fragment data), which if set indicates that the fragment need not be processed (and can be discarded). The pipeline processing stages are configured to check the killed bit of each fragment they receive for processing (and to then process the fragment or not, accordingly).

Alternative arrangements, such as having a fragment queue with validity tags that operates like a cache to release queue (cache) lines if a fragment's invalid tag is set could instead or also be used if desired.

Each stage of the graphics processing pipeline that the early culling test pass events are broadcast to has a corresponding agent that is responsible for all the fragments in its local domain (i.e. in the stage or part of the processing stage in question). Each agent keeps information about the fragments in its local domain and is operable to mark fragments as killed (invalid) to avoid and/or stop unnecessary processing of them in response to an early culling test pass event that it receives. The agents are configured to be able to test all the fragments in their local domain in parallel.

As shown in FIG. 3, in the present embodiment the graphics processing pipeline includes a queue 12 that the fragments must pass through which is positioned before the fragment shader 27 of the graphics processing pipeline. The queue 12 is configured to be able to hold one full tile-size set of fragments, although other arrangements would, of course, be possible.

The queue 12 has the effect of increasing the number of fragments that may be in the pipeline after the early culling test stages (i.e. after the hierarchical depth and stencil tester 40 and the early depth and stencil tester 26), thereby increasing the number of fragments that may be subjected to the operation in the manner of the present embodiment. The use of the queue 12 can increase significantly the likelihood of only ultimately visible fragments reaching (and being processed by) the fragment shading stage 27 that comes after the queue 12. This is advantageous, as fragment shading is typically a relatively costly process per fragment, and so the fewer fragments that enter the fragment shader, the better.

The fragments that enter the queue 12 exit the queue in the same order, but "killed" fragments trigger the freeing of resources when they exit the queue.

The above describes certain features of the operation of the graphics processing system shown in FIGS. 1, 2 and 3. Further features of the operation of the graphics processing system shown in FIGS. 1, 2 and 3 in accordance with embodiments of the technology described herein will now be described.

As shown in FIGS. 2 and 3, the graphics processing pipeline of the present embodiment includes both an early depth and stencil test stage (tester) 26 and a late depth and stencil test stage (tester) 28, that appear before and after the fragment shader pipeline 27, respectively.

While it would be possible to have every fragment issued by the rasteriser 25 undergo the early depth and stencil test 26 (and/or undergo both the early depth and stencil test 26 and the late depth and stencil test 28), in the present embodiment, and in accordance with the technology described herein, fragments are selectively controlled to undergo either one or both of the early and late depth and stencil tests and, moreover, are selectively controlled to undergo either one or both of the early and late depth and stencil tests separately for the purposes of determining whether to cull (kill) the fragment from further processing, and for the purposes of determining whether to update the depth and stencil buffers 5 with data for the fragment.

This is achieved, as discussed above, by providing for each fragment two sets of state information, in the form of a 2-bit "kill" flag and a 2-bit "update" flag, respectively, that is then used by the graphics processing pipeline 3 to determine and control how the fragment is tested for the purposes of both killing the fragment and updating the depth and stencil buffers 5.

In particular, as shown in FIG. 3, control logic 43 that is operable to control and configure the operation of the early depth and stencil test 26 and the late depth and stencil test 28 is operable to read the "kill" flag 44 and "update" flag 45 from a descriptor 46 for the draw call being processed (which is stored appropriately for access by the control logic 43), and to configure the operation of the early depth and stencil test 26 and the late depth and stencil test 28 accordingly.

In particular, each fragment can have indicated for it one of four different depth and stencil testing modes for the purposes of determining whether to cull (kill) the fragment or not, and, separately, one of four different depth and stencil buffer 5 update modes of operation for the purpose of determining whether to update the depth and stencil buffers 5 with data for the fragment.

Table 1 below shows the different modes of operation that can be set in respect of using the early and late depth and stencil tests to determine whether to kill (cull) a fragment from further processing or not. As shown in Table 1, each mode of operation has a respective flag value and descriptive name, and indicates, inter alia, whether the fragment is to undergo the early or late depth and stencil test (and whether that is conditional or not), and whether the testing of the fragment should wait for any dependency for the fragment (on another fragment that is already in the pipeline and being processed) to clear or not (i.e. in particular, whether the early depth and stencil test should be performed only after waiting for any dependency of the fragment to clear, or should be performed in any event without waiting for any dependency of the fragment to clear).

a per draw call basis (for a draw call) (with each primitive and fragment for that draw call then having the modes of operation set for the draw call). Other arrangements would, of course, be possible.

In the present embodiment, the driver sets the "kill" and "update" mode of operation for a draw call based on one or more of the following API (Application Program Interface) operations that have been specified for the graphics processing operations to be performed (in the present embodiment for the draw call in question):

whether the fragment shader has side effects;

whether rendered fragments are to be blended with other fragments or simply to overdraw other fragments;

whether the fragment shader program could create further fragment dependencies (e.g. contains a conditional fragment kill instruction, an instruction that can modify the fragment coverage, or executes an alpha test);

TABLE 1

Field fragment_kill_operation values

| Value | Name | Meaning | Wait | Early ZS test | Late ZS test |
|---|---|---|---|---|---|
| 0 | force_early | Wait for fragment dependency to clear, force early z testing. If early z fails, fragment is killed. | true | true | false |
| 1 | strong_early | Do early z even in case of fragment dependency (don't wait for it to resolve). If early z is run and fails, fragment is killed, otherwise retry at late z. | false | true | dep |
| 2 | weak_early | Do early z test if no fragment dependency. If early z is run and fails, fragment is killed. | false | no dep | dep |
| 3 | force_late | Do not trigger early z test. (If early z is run anyway due to the update-flag and fails, fragment is not killed before late z.) | false | false | true |

Table 2 correspondingly shows the fragment data buffer "update" operation modes that can be chosen and set for a fragment:

whether the shader program includes occlusion queries;

the source for the depth and stencil values that will be used by the tests;

TABLE 2

Field zs_update_operation values

| Value | Name | Meaning | Wait | Early upd | Late upd |
|---|---|---|---|---|---|
| 0 | force_early | Wait for fragment dependency to clear and do early z test and update (killing is not affected). | true | true | false |
| 1 | strong_early | Do early z test and update even if there is a fragment dependency (don't wait for it to resolve). E.g. Hier-z may have information about known_to_pass = 1, update z in this case. When the earlier thread finishes it will fail due to the new z-buffer value even if it would have passed earlier. Note that the strong_early update only updates in cases it is legal (e.g. if there is a dependency and known_to_pass = 0 then do late z update. (also do early z update in case of no dependency). | false | true | false |
| 2 | weak_early | Do early z test and update if no fragment dependency, late z in case of dependency, (killing is not affected). | false | no dep | dep |
| 3 | force_late | Do not do early z update even if early z test was performed (unless it was killed and op-stencil-fail! = keep). | false | false | true |

Which of the above modes of operation to use for determining whether to kill fragments using the early and late depth and stencil tests, and for determining how to update the depth and stencil value buffers 5 using the early and late depth and stencil tests, is determined by the driver 4 for the graphics processing pipeline (GPU) 3 based on the graphics processing operation or operations that is required by the application 2. The driver sets the appropriate "kill" and "update" modes of operation in the present embodiment on how the depth test evolves (e.g. changes from less than or equal to to less than (and vice-versa) or changes from less than to greater than (and vice-versa);

whether the application has specified (forced) early or late depth and stencil testing.

The driver considers which of these API operations is present in a draw call, and sets the fragment kill operation mode and fragment depth and stencil buffer update operation mode accordingly.

Figure 4:
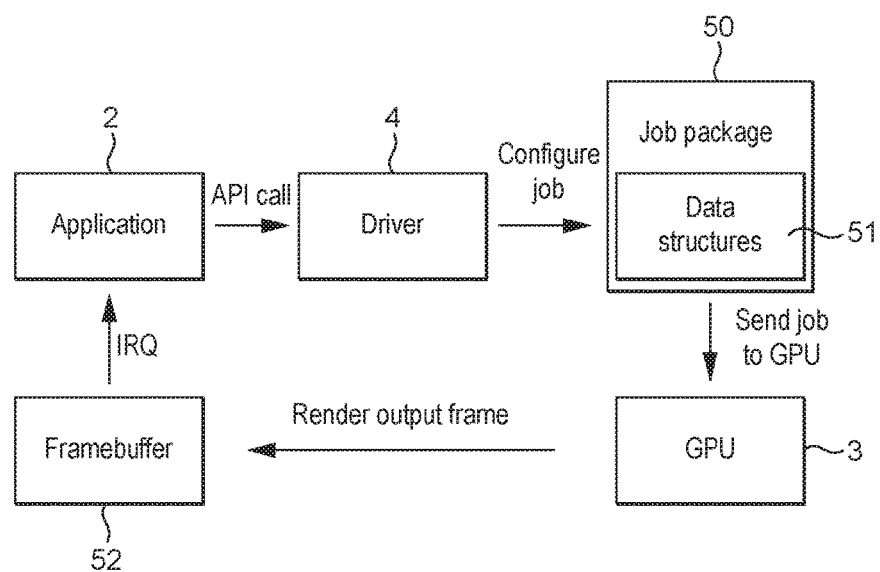
FIG. 4 shows in more detail the interaction of the driver and the graphics processing pipeline in an embodiment of the technology described herein.
Figure 5:
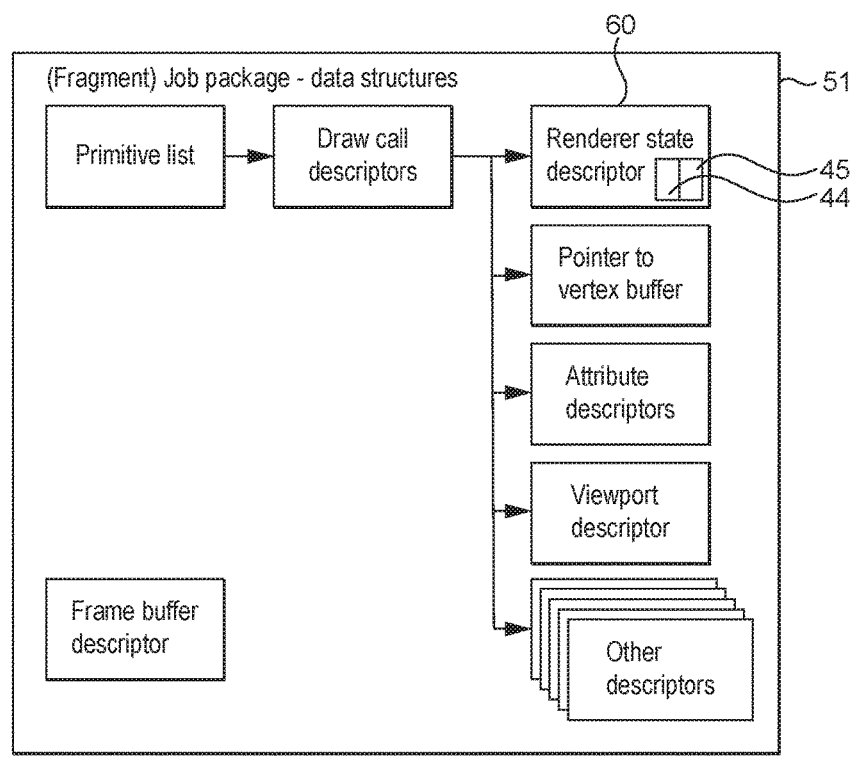
FIG. 5 shows in more detail the location of the state information that is used in an embodiment of the technology described herein.
Figure 6:
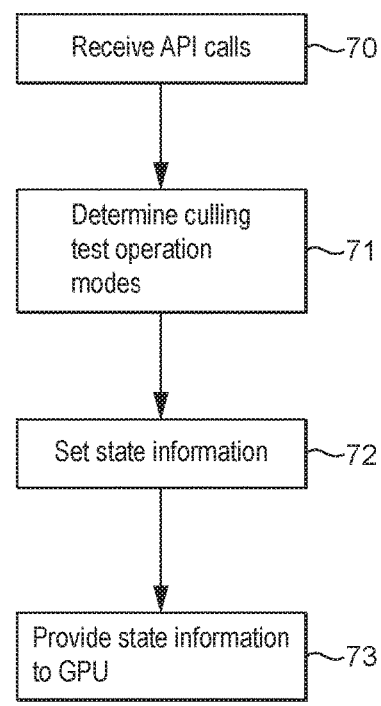
FIG. 6 shows schematically the operation of the driver for the graphics processing pipeline in an embodiment of the technology described herein.

FIGS. 4, 5 and 6 illustrate this operation in more detail.

As shown in FIG. 4, in this operation, the driver 4 for the graphics processing unit (pipeline) 3 will receive, inter alia, API calls from an application 2 that requires graphics processing and based on those API calls configure a "job package" 50, including a set of data structures 51, that define the graphics processing operation (the "job") that the graphics processing pipeline is to perform. The job package 50 is sent to the GPU 3, which operates accordingly to render the desired output frame to a frame buffer 52 (which may be in main memory of the overall graphics processing system, for example).

FIG. 4 shows the data structures 51 of the job package 50 in more detail. As can be seen from FIG. 5, the data structures include a number of different descriptors, including a set of draw call descriptors that include appropriate state information for instructing the graphics processing pipeline 3 for performing the desired graphics processing operation. These draw call descriptors include a renderer state descriptor 60, in which the driver 4 includes the first and second sets of state information (the "kill" flag 44 and "update" flag 45) that are used in the present embodiments.

FIG. 6 is a flowchart showing the operation of the driver 4.

As shown in FIG. 6, the driver receives the API calls (step 70) from the application 2 and determines based on those API calls the culling test operation modes to use (step 71). The driver then sets the state information for the culling test operation modes in the renderer state descriptor 60 accordingly (step 72), and provides that state information (and the remaining state information) to the graphics processing pipeline (GPU) 3 (step 73) so that the graphics processing pipeline 3 can perform the desired graphics processing operations.

Table 3 below shows the combinations of kill and update modes of operation that are set for particular use cases (i.e. for particular states of the API operations discussed above) in the present embodiments. Table 3 also shows the operation that will happen depending upon whether the fragment in question has a dependency on other fragments or not.

Other arrangements would, of course, be possible.

TABLE 3

| Kill/update combinations | | | | |
|---|---|---|---|---|
| Kill | Update | No dependency | Dependency | Use cases |
| force_early | force_early | Calculate coverage. Test ZS early. Update z/stencil early. Surviving fragments run shader. | Wait for fragment dependency to clear, proceed as for no dependency. The dependency chain is broken by stalling | Forced early by API or all of: no side effects, no shader modifies coverage and depth/stencil source = one of fixed/min/max (cannot be shader). |
| force_early | strong_early | ---"--- | ---"--- | ---"--- |
| force_early | weak_early | ---"--- | ---"--- | ---"--- |
| strong_early | force_early | ---"--- | ---"--- | ---"--- |
| weak_early | force_early | ---"--- | ---"--- | ---"--- |
| force_early | force_late | Calculate coverage. Test ZS early. Surviving fragments run shader. Update z/stencil late. | Wait for fragment dependency to clear, proceed as for no dependency. Dependencies are maintained, but less so since killing early is allowed. | Shaders that modify coverage Use (only) for content that creates new dependencies. |
| strong_early | strong_early | Calculate coverage. Test ZS early. Update z/stencil early. Surviving fragments run shader. | Calculate coverage. Test ZS early. Update z/stencil early. Surviving fragments run shader. Dependencies are maintained, but less so since killing and updating early + broadcast "kill" signal is allowed. | Normal case for depth source min/max. Not allowed for shader modifies coverage. Use (only) for content that creates new dependencies. |
| weak_early | strong_early | Calculate coverage. Test ZS early. Update z/stencil early. Surviving fragments run shader. | Calculate coverage. Update z/stencil early. All fragments run shader. Test ZS late. Dependencies are maintained, | Use for clearing with fixed depth but deciding zs-pass from shader output. Use (only) for content that creates new dependencies. |

TABLE 3-continued

Kill/update combinations

| Kill | Update | No dependency | Dependency | Use cases |
|---|---|---|---|---|
| | | | but less so since updating early is allowed. | |
| strong_early | weak_early | Calculate coverage. Test ZS early. Update z/stencil early. Surviving fragments run shader. | Calculate coverage. Test ZS early. Surviving fragments run shader. Update z/stencil late. Dependencies are maintained, but less so since killing early is allowed. | Fallback for strong_early/strong_early when blending is enabled. Use (only) for content that creates new dependencies. |
| strong_early | force_late | Calculate coverage. Test ZS early. Surviving fragments run shader. Update z/stencil late. | Calculate coverage. Test ZS early. Surviving fragments run shader. Update z/stencil late. Dependencies are maintained, but less so since killing early is allowed. | Shaders that modify coverage. Depth/stencil source = fixed/min/max Use (only) for content that creates new dependencies. |
| weak_early | weak_early | Calculate coverage. Test ZS early. Update z/stencil early. Surviving fragments run shader. | Calculate coverage. All fragments run shader. Test ZS late. Update z/stencil late. Dependencies are maintained, but allow instant progress rather than blocking. | Fallback from all strong/weak combinations when z-test changes. Fallback from weak_early + strong_early when blending is enabled. Can also be used for fragments which do not modify coverage. depth_source = fixed. Use (only) for content that creates new dependencies. |
| weak_early | force_late | Calculate coverage. Test ZS early. Surviving fragments run shader. Update z/stencil late. | Calculate coverage. All fragments run shader. Test ZS late. Update z/stencil late. Dependencies are maintained, but allow instant progress rather than blocking. | Fallback from strong_early kill + force_late update when z-test changes. Only use for content that creates new dependencies. |
| force_late | force_early | Calculate coverage. Update z/stencil early. All fragments run shader. Test early, but delay kill until shader complete side effects. | Wait for fragment dependency to clear, proceed as for no dependency. The dependency chain is broken by stalling | Shaders with side-effects only. Shader does not modify coverage, depth/stencil source = fixed. |
| force_late | strong_early | Calculate coverage. Update z/stencil early. All fragments run shader. Test early, but delay kill until shader | Calculate coverage. Update z/stencil early. All fragments run shader. Test ZS late. Dependencies are maintained, but less so since updating early is | Shaders with side-effects, Shader does not modify coverage, depth source = min/max. Only used for content that create new dependencies. |

TABLE 3-continued

Kill/update combinations

| Kill | Update | No dependency | Dependency | Use cases |
|---|---|---|---|---|
| | | complete side effects. | allowed. | |
| force_late | weak_early | Calculate coverage. Update z/stencil early. All fragments run shader. Test early, but delay kill until shader complete side effects. | Calculate coverage. All fragments run shader. Test ZS late. Update z/stencil late. Dependencies are maintained, but instant progress is allowed rather than waiting. | Side effects (and not forced early), shader modify coverage and depth_source = fixed Also fallback for force_late kill + strong_early update when depth test changes, shader modifies coverage or blending is enabled. Only used for content that create new dependencies. |
| force_late | force_late | Calculate coverage. All fragments run shader. Test ZS late. Update z/stencil late. | Calculate coverage. All fragments run shader. Test ZS late. Update z/stencil late. Dependencies are maintained, but instant progress is allowed rather than waiting. | Used in all cases with depth/stencil source = shader and depth/stencil func != always pass. Shaders with side effects (and not forced early) not covered by the other cases go here. Only used for content that creates new dependencies. |

Table 4 below shows how the kill and update modes of operation are controlled in accordance with the source of the depth/stencil values that are being used in the present embodiment.

TABLE 4

| Interaction with depth/stencil source | |
|---|---|
| Depth/stencil source | Use cases |
| Fixed | Kill/update flags functions as normal |
| Min (fixed, shader) | Kill/update flags affect fixed values, shader output is always late (repeated testing) |
| Max (fixed, shader) | Kill/update flags affect fixed values, shader output is always late (repeated testing) |
| Shader | Kill/update flags are ignored, everything is late |

In general, in the present embodiments, the following considerations are, in particular, taken into account when determining the kill and update modes of operation for fragments (for a draw call):

Side effects should have force_late kill if not forced early.
Side effects should not be strong/weak early kill.
If depth/stencil source is a shader, then should not kill/update early.
Occlusion query effects on strong/weak early: Since broken dependencies require re-testing at late z, occlusion queries are not considered answered before late z in case of dependencies. Thus strong early is prohibited once occlusion queries with dependencies has been submitted with strong/weak early.
min/max depth source recommends strong/force early since re-testing at late z is required anyway
Blending requires drawing in order, so later primitives can't use strong early z to destroy the depth-test for the earlier blend quads.
Dependencies are in an embodiment only considered when the depth/stencil value for a previous fragment is outstanding and required for the outcome of the zs test of a new fragment. Thus cases such as zs-test=always pass, and z/stencil write disabled, are in an embodiment not counted as a dependency and are passed on even when there is forced early z and outstanding zs-writes.

In the present embodiment, each tile that is being processed also has associated with it an "override" flag that if set forces all "strong early" tests to become "weak early" tests. The flag is set for a tile as a whole (and reset when a new tile is started). The flag is set in the following circumstances:

If a fragment is sent to late z, the flag is set when the depth test changes from having the <-bit set to having the >-bit set or vice versa. E.g.
Changing from < to >, > to <, <= to >, <= to always or similar sets it
Changing from < to <=, > to >= or = to > and similar does not set it.
If occlusion queries are used with strong early and the query is not answered early, then the flag is set.
If a shader reads depth/stencil, then the flag is set.

An example of the operation of the present embodiments for a group of four primitives, A, B, C and D, will now be described for illustration purposes.

In this example, it is assumed that from the application (API) side, the depth buffer is first cleared to "1".

There is then a first primitive A to be drawn at depth Z=0.5, that has a depth test "less than", and a shader program that modifies coverage (and so thus will create a dependency). In this case, the driver will set this primitive to have a force-early culling (kill) state, and a force-late update state.

The next primitive, primitive B, is to be drawn at Z=0.4, again with a depth test "less than", and is completely opaque. For this primitive, the driver is accordingly free to choose both strong and weak-early as well as force-early/late, but in the present embodiment will choose force-early for the kill state and force-early for the update state, as that will be more efficient for most content.

There is then a third primitive, primitive C, to be drawn at Z=0.6, again with a depth test "less than", but which primitive it has assumed has a shader program that includes side effects and is forced-late by the application (API). The driver accordingly configures a force-late kill state and a force-early update state for this primitive.

Finally, there is a primitive D, to be drawn as Z=0.7, with a depth test "less than", and which is completely opaque. The driver accordingly sets a force-early kill state and a force-early update state for this primitive (similar to primitive B).

These four primitives with their associated kill and update states are then sent to the graphics processing pipeline for processing.

Thus, primitive A will enter the rasterisation stage first, and the rasteriser will split primitive A into fragments. When the fragments from primitive A reach the early depth (z) tester, they will all perform an early z test and all pass (as the depth buffer is set to "1" at this point). At this point a dependency is created because primitive A is to undergo a shader operation that could modify coverage.

Primitive B will then enter the rasteriser and the rasteriser will correspondingly split primitive B into fragments.

The fragments for primitive B will then reach the early depth tester, where they will discover a dependency to the unfinished fragments from primitive A. Due to the force-early kill and update state that they have been allocated, the fragments from primitive B will wait until the processing of the fragments having the same position from primitive A is complete (i.e. for the dependency to clear). All fragments from primitive B will then finish the early depth and stencil testing before entering the rendering pipeline. This will have the effect of breaking the dependency chain on primitive A.

Primitive C will enter the rasteriser next, and the rasteriser will again split primitive C into fragments.

The fragments for primitive C when they reach the early depth tester will fail for positions covered by primitive B (as they are at a greater depth than primitive B), but discover a dependency to any unfinished fragments from primitive A that were not covered by primitive B (in particular, if fragments from primitive A will be drawn, then fragments from primitive C will fail, otherwise they will pass).

Thus, fragments from primitive C are forced to wait until any dependency on fragments from primitive A is resolved (because primitive C has a forced-early update state).

Once any primitive C fragments dependency on fragments from primitive A clears, the depth buffer can be updated to Z=0.6 for those fragments of primitive C so there is no dependency to future fragments.

However, even though the fragments from primitive C have been subject to the early depth test for updating purposes (and the dependency has resolved), those fragments will still be processed by the rest of the graphics processing pipeline and killed at the late depth tester stage (as their kill state is force-late) (but they will not create a new dependency).

Primitive D is the next primitive to enter the rasteriser and the rasteriser again will split primitive D up into fragments.

The fragments from primitive D will, when they reach the early depth tester, fail for positions covered and completed by primitives A, B and C. However, a dependency will be detected for fragments for positions covered by primitive A that are not yet completed, and again the fragments from primitive D will wait for that dependency to resolve. Fragments covered by primitives B and C on the other hand have already cleared the dependency on primitive A, so no waiting will happen for any fragments from primitive D that have positions covered by primitives B or C (even though a fragment on the same position for primitive C may still be executing in the rendering pipeline).

In this example (and in the embodiments of the technology described herein generally), the existence of a dependency for fragment positions can be determined and monitored as desired. For example, an appropriate data structure can be used to track those fragment and sampling positions in the render output for which a dependency exists, and then used to determine whether a new fragment could have a dependency or not. Other arrangements would, of course, be possible.

It can be seen from the above that the technology described herein, in its embodiments at least, provides a mechanism for more efficiently performing hidden surface removal in a pipelined graphics processing system.

This is achieved, in the embodiments of the technology described herein at least, by using state information that is set based on the graphics processing operations to be performed to control separately the operation of the early and late culling test stages of the graphics processing pipeline with respect to the culling of graphics fragments and the updating of the culling test data buffer.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that includes:
   a rasteriser that rasterises input primitives to generate graphics fragments, each graphics fragment having one or more sampling points associated with it;
   a renderer that processes fragments generated by the rasteriser to generate output fragment data;
   an early culling tester configured to perform an early culling test on fragments generated by the rasteriser before the fragments are sent to the renderer for processing;
   a late culling tester configured to perform a late culling test on fragments that have been processed by the renderer before the fragments are output by the renderer to provide output fragment data for sampling points associated with the fragments; and
   a culling test data buffer configured to store data values for use by the early and late culling testers;
   the method comprising:
   providing for a graphics fragment generated by the rasteriser:
      a first set of state information indicative of whether to perform an early culling test or a late culling test operation to determine whether to cull the fragment; and
      a second, separate, set of state information indicative of whether to update the culling test data buffer with data for the fragment based on an early culling test or a late culling test operation;

and the graphics processing pipeline:

subjecting the fragment to an early culling test or a late culling test operation in accordance with the first set of state information provided for the fragment to determine whether to cull the fragment or not; and determining whether to update the culling test data buffer with data for the fragment based on an early culling test or a late culling test operation in accordance with the second set of state information provided for the fragment.

2. The method of claim 1, comprising providing first and second sets of state information for a graphics draw call that is to be used in common for all primitives and fragments of the draw call.

3. The method of claim 1, wherein the first and second sets of state information indicate whether a fragment should be subjected to an early culling test or a late culling test in dependence on at least one condition.

4. The method of claim 1, wherein the first and second sets of state information indicate whether a fragment should be subjected to an early culling test by the early culling tester without waiting for any dependency on the processing of another fragment to be cleared.

5. The method of claim 1, wherein when an early culling test is performed for a fragment that has a dependency on the processing of another fragment without waiting for that dependency to be cleared, the early culling test is performed in a conservative manner and to the extent possible, so as to:

in the case of an early culling test to determine whether to cull the fragment, only determine to cull the fragment when it can be determined by the early culling test with the necessary certainty that the fragment will be occluded; and in the case of an early culling test to determine whether to update the culling test data buffer with data for the fragment, only determine to update the culling test data buffer when it can be determined by the early culling test with the necessary certainty that the fragment will not be occluded.

6. The method of claim 1, wherein the first and second sets of state information indicate whether to subject a fragment to an early culling test when it has no dependency on the processing of another fragment, but to a late culling test when it does have a dependency on the processing of another fragment.

7. The method of claim 1, comprising the early culling tester using information received from another early culling test of the graphics processing pipeline when performing an early culling test on fragments generated by the rasteriser.

8. The method of claim 1, further comprising:

selecting whether to perform an early culling test or a late culling test operation to determine whether to cull a fragment, and selecting whether to update the culling test data buffer with data for a fragment based on an early culling test or a late culling test operation, based on graphics processing operations that are to be performed when processing the fragment.

9. The method of claim 8, comprising selecting whether to perform an early culling test or a late culling test operation to determine whether to cull a fragment, and selecting whether to update the culling test data buffer with data for a fragment based on an early culling test or a late culling test operation, based on at least one of:

operations of a shader program that is to be executed when processing the fragment;

whether the processing of the fragment is being used for occlusion query purposes;

whether the rendered fragment data for a fragment is to be blended with other rendered fragment data;

any application specified culling test operations; and the source or sources of the culling test data values to be used when testing a fragment.

10. The method of claim 1, further comprising:

when at least one sampling point associated with a fragment passes an early culling test, sending the fragment onwards for processing and determining if the processing of another sampling point that is in the graphics processing pipeline can be stopped as a consequence of the at least one sampling point passing the early culling test.

11. A graphics processing system, comprising:

a graphics processing pipeline comprising:

a rasteriser that rasterises input primitives to generate graphics fragments, each graphics fragment having one or more sampling points associated with it;

a renderer that processes fragments generated by the rasteriser to generate output fragment data;

an early culling tester configured to perform an early culling test on fragments generated by the rasteriser before the fragments are sent to the renderer for processing;

a late culling tester configured to perform a late culling test on fragments that have been processed by the renderer before the fragments are output by the renderer to provide output fragment data for sampling points associated with the fragments; and a culling test data buffer configured to store data values for use by the early and late culling testers;

the graphics processing system further comprising:

state information providing processing circuitry configured to provide for a graphics fragment generated by the rasteriser:

a first set of state information indicative of whether to perform an early culling test or a late culling test operation to determine whether to cull the fragment; and a second, separate, set of state information indicative of whether to update the culling test data buffer with data for the fragment based on an early culling test or a late culling test operation;

and the graphics processing pipeline further being configured to:

subject a fragment to an early culling test or a late culling test operation in accordance with a first set of state information provided for the fragment to determine whether to cull the fragment or not; and determine whether to update the culling test data buffer with data for a fragment based on an early culling test or a late culling test operation in accordance with a second set of state information provided for the fragment.

12. The system of claim 11, wherein the state information providing processing circuitry is configured to provide first and second sets of state information for a graphics draw call that is to be used in common for all primitives and fragments of the draw call.

13. The system of claim 11, wherein the first and second sets of state information indicate whether a fragment should be subjected to an early culling test or a late culling test in dependence on at least one condition.

14. The system of claim 11, wherein the first and second sets of state information indicate whether a fragment should be subjected to an early culling test by the early culling tester without waiting for any dependency on the processing of another fragment to be cleared.

15. The system of claim 11, wherein the early culling tester is configured to, when an early culling test is performed for a fragment that has a dependency on the processing of another fragment without waiting for that dependency to be cleared:
perform the early culling test in a conservative manner and to the extent possible, so as to:
in the case of an early culling test to determine whether to cull the fragment, only determine to cull the fragment when it can be determined by the early culling test with the necessary certainty that the fragment will be occluded; and
in the case of an early culling test to determine whether to update the culling test data buffer with data for the fragment, only determine to update the culling test data buffer when it can be determined by the early culling test with the necessary certainty that the fragment will not be occluded.

16. The system of claim 11, wherein the first and second sets of state information indicate whether to subject a fragment to an early culling test when it has no dependency on the processing of another fragment, but to a late culling test when it does have a dependency on the processing of another fragment.

17. The system of claim 11, wherein the early culling tester is configured to use information received from another early culling test of the graphics processing pipeline when performing an early culling test on fragments generated by the rasteriser.

18. The system of claim 11, wherein the state information providing processing circuitry is configured to:
select whether to perform an early culling test or a late culling test operation to determine whether to cull a fragment, and select whether to update the culling test data buffer with data for a fragment based on an early culling test or a late culling test operation, based on graphics processing operations that are to be performed when processing the fragment.

19. The system of claim 18, wherein the state information providing processing circuitry is configured to select whether to perform an early culling test or a late culling test operation to determine whether to cull a fragment is to be performed, and to select whether to update the culling test data buffer with data for a fragment based on an early culling test or a late culling test operation, based on at least one of:
operations of a shader program that is to be executed when processing the fragment;
whether the processing of the fragment is being used for occlusion query purposes;
whether the rendered fragment data for a fragment is to be blended with other rendered fragment data;
any application specified culling test operations; and
the source or sources of the culling test data values to be used when testing a fragment.

20. The system of claim 18, wherein the early culling tester is configured to:
when at least one sampling point associated with a fragment passes an early culling test, send the fragment onwards for processing, and provide information for determining if the processing of another sampling point that is in the graphics processing pipeline can be stopped as a consequence of the at least one sampling point passing the early culling test to at least one other stage of the graphics processing pipeline.

21. A non-transitory computer readable storage medium storing computer software code which when executing on at least one processor performs a method of setting state information for graphics fragments to be processed by a graphics processing pipeline, the method comprising:
for at least one graphics fragment to be processed:
determining from requests received for graphics processing operations from an application that requires graphics processing by the graphics processing pipeline:
whether to perform an early culling test or a late culling test operation to determine whether to cull the at least one graphics fragment; and
whether to update a culling test data buffer using data for the at least one graphics fragment based on an early culling test or a late culling test operation; and
providing for the at least one graphics fragment:
a first set of state information indicative of whether to perform an early culling test or a late culling test operation selected to determine whether to cull the at least one fragment; and
a second, separate, set of state information indicative of whether to update the culling test data buffer with data for the fragment based on an early culling test or a late culling test operation.

* * * * *